(12) United States Patent
Chandra et al.

(10) Patent No.: US 6,397,359 B1
(45) Date of Patent: May 28, 2002

(54) METHODS, SYSTEMS AND COMPUTER PROGRAM PRODUCTS FOR SCHEDULED NETWORK PERFORMANCE TESTING

(75) Inventors: Vikas Chandra, Cary; Mark Eric McCorry, Raleigh; David Vi Hien Quan, Cary; Peter James Schwaller, Raleigh; Christopher David Selvaggi, Cary; John Lee Wood, Raleigh, all of NC (US)

(73) Assignee: NetIQ Corporation, Santa Clara, CA (US)

( * ) Notice: Subject to any disclaimer, the term of this patent is extended or adjusted under 35 U.S.C. 154(b) by 0 days.

(21) Appl. No.: 09/234,276

(22) Filed: Jan. 19, 1999

(51) Int. Cl.⁷ .......................... G06F 11/00; G06F 13/00
(52) U.S. Cl. ................... 714/712; 709/224; 710/105
(58) Field of Search .................. 714/712, 4, 38; 710/105; 703/13, 21; 702/108, 122, 182; 709/224, 200, 223, 238; 370/231, 251, 254

(56) References Cited

U.S. PATENT DOCUMENTS

| | | |
|---|---|---|
| 4,545,011 A | 10/1985 | Lyon et al. |
| 5,049,873 A | 9/1991 | Robins et al. |
| 5,107,450 A | 4/1992 | Lawrenz |
| 5,257,393 A | 10/1993 | Miller |
| 5,572,640 A | 11/1996 | Schettler |
| 5,634,009 A | 5/1997 | Iddon et al. |
| 5,706,436 A | 1/1998 | Lewis et al. |
| 5,732,213 A | 3/1998 | Gessel et al. |
| 5,764,915 A | 6/1998 | Heimsoth et al. |
| 5,809,286 A | 9/1998 | McLain, Jr. et al. |
| 5,838,919 A | * 11/1998 | Schwaller et al. |
| 5,881,237 A | * 3/1999 | Schwaller et al. |
| 5,937,165 A | * 8/1999 | Schwaller et al. |
| 6,061,725 A | * 5/2000 | Schwaller et al. |

OTHER PUBLICATIONS

Brochure, "Network General Corporation: Products and Services", Network General Corporation (1995).
Brochure, "Pro View: Network Performance Management Systems", Network Telemetrics, Inc. (1995).
Brochure, "Managing the User Environment across Integrated SNA and IP Networks", Network Telemetrics, Inc. (1995).
Brochure, "Using Performance Baselines to Manage Network Service Levels", Williamson, W., Network Telemetrics, Inc. (1995).

(List continued on next page.)

Primary Examiner—Gopal C. Ray
(74) Attorney, Agent, or Firm—Myers Bigel Sibley & Sajovec, P.A.

(57) ABSTRACT

Methods, systems and computer program products are provided which test network performance by defining test schedules including test protocols to be implemented and when the protocols should be executed for a plurality of defined connections on a network. A connection may be defined between two endpoint nodes on the network. At times specified in the test schedule, the endpoint node pair executes the test protocol and measures the performance of the network connection between the two nodes without requiring any involvement of application software which may or may not be installed on the computer hardware supporting the endpoint node. The test protocol may define the type of network layer protocol to utilize (for example, TCP), and the test script or scripts to be communicated using the appropriate stack on the computer hardware supporting the endpoint node. The schedule may be provided with an expiration date and a console node is provided for distribution of test schedules, monitoring of availability of endpoint nodes and receipt of measured performance measurements for reporting to a network manager. In further aspects of the present invention, auto-thresholding and coordination of interrelated but asynchronous tasks executing at the console node are provided.

34 Claims, 9 Drawing Sheets

OTHER PUBLICATIONS

Brochure, "Standard Based Distributed Diagnostics for Enterprise Networks", Frontier Software Development, Inc. (Sep. 1995).

Brochure, "Quality Works—The most complete client/server testing solution you can buy", Segue Software Products (1996).

Brochure, "LANQuest: Net/WRx", LANQuest (Sep. 12, 1995).

Brochure, "Netbench(R) 3.01 Frequently Asked Questions", Ziff–Davis Benchmark Operation.

Brochure, EcoNET: The View from the Top, Hurwitz Consulting Group, Inc. (1995).

Brochure, "Visual OnRamp™ Managed Internet Access Device"(1–96).

Brochure, "FirstSense".

Brochure "NextPoint".

Brochure, "NextPoint Frame Relay™".

Brochure, "VeriServ™," Response Networks, Inc.

Brochure, "Service Management Architecture Product Overview," Jyra Research, Inc.

Brochure, "Optimal Application Expert™" Optical Networks Corp. (1997).

Article, Sobel, Ken; "Compuware's EcoSCOPE";Hurwitz Group, Inc. (9/97).

Butterfield, "System Performace Monitor/2 Reference," International Business Machines Corporation (1991).

Brochure, "The DA–30®family of internetwork analyzers", Wandel & Goltermann (1994).

Brochure, "DA–30C benchmarking Capabilities", Wandel & Goltermann (1995).

Brochure, "Vital Signs VisionNet", BlueLine Software, Inc., including inserts "LAN Agent", "VTAM Agent", "NCPL Agent" (1995).

Brochure, Vital Signs VisionNet (1995).

Brochure, "SmartBits: Switch testing in its simplest form . . . ", Netcom Systems, Inc. (1995).

Brochure, "EconNET™: Networked Applications Performance Management", Compuware Corporation (1995).

Brochure, Hot off the Shelf: Application Management, Data Communications (Jan. 1996).

Brochure, "10 Reasons Why You Need an Applications View of Your Network," Compuware Corporation (Jan. 9, 1996).

* cited by examiner

METHODS, SYSTEMS AND COMPUTER PROGRAM PRODUCTS FOR SCHEDULED NETWORK PERFORMANCE TESTING

FIELD OF THE INVENTION

The present invention, generally, relates to network communication methods, systems and computer program products and, more particularly, to systems, methods and computer program products for performance testing of computer networks.

BACKGROUND OF THE INVENTION

Companies are often dependent on mission-critical network applications to stay productive and competitive. To achieve this, information technology (IT) organizations preferably provide reliable application performance on a 24-hour, 7-day-a-week basis. In this demanding environment, frequent network expansion and day-to-day fire fighting often leave little time for IT managers to manage network performance proactively. Accordingly, IT managers typically rely on some form of system management and/or network management tools to help automate performance management tasks to increase the efficiency of the IT staffs. Even with these tools, IT staffs are typically required to commit resources to integrating and customizing the tools to work in the heterogeneous network environments which may include, for example, hardware from a variety of vendors, executing a variety of operating systems and communication protocols and supporting a variety of application programs for different end user requirements.

Various known system management products track specific information, such as the CPU utilization on a server, server paging and disk access activity, or client application response time. This information may be useful when solving problems on a network. These products can generally be categorized as passive system and application monitors. This category typically is implemented as software agent technologies that reside on the client or server computers. They generally passively monitor live application transactions and monitor resource utilization. Products in this category include Patrol from BMC Software, Inc., FirstSense Agent from FirstSense Software, Inc., S3 from NextPoint Networks, Inc., VitalSuite from INS, Luminate Software Corp., and Envive Corp. As they are passive application monitors, they typically support only specific application programs. For example, Luminate Software and Envive support the SAP R/3 application, NextPoint Networks and BMC Software support the Oracle database. Their measurements are neither consistent nor repeatable, as a user's interaction with a given application varies over time. moreover, they are typically not suited to detecting system slowdowns or failures from the perspective of an end user.

Another category of of system management tool is active application monitors. These are products that generally measure performance by actively emulating application transactions. These transactions are often referred to as "synthetic" transactions. Products in this category include VeriServ from Response Networks, Inc. and SLM from Jyra Research Inc. VeriServ allows an operator to define the types of applications to be monitored, times and days, and the end user locations from which the transactions are to originate. The operator may also choose to define alarm thresholds. Agents installed at the end user location monitor actual sample application transactions to measure performance of the applications operating over the network environment. VeriServ automatically tests applications at a fixed interval. SLM provides the flexibility for the user to schedule synthetic transactions for any interval from 5 minutes to a year. However, as these approaches are also typically directed to a particular application and require that the applications be installed and operating to generate network traffic, they generally only address simple web and database transactions. Also, any new or custom applications may require extensive configuration by the users to allow the tester to interact with the applications.

Another approach to passive monitoring is directed to the network rather than the overall system. On the network side, element managers or passive network monitors are known which may address a specific segment or device on the network. Element managers are generally software designed to manage specific groups of devices, such as routers and switches. Passive network monitors are typically a combination of hardware and software that may, for example, monitor network traffic at the link layer or at the infrastructure devices. Products falling in this category include remote monitor (RMON) probes from NetScout Systems, Inc., Sniffer from Network Associates, NetMetrix from Hewlett-Packard, Application Expert from Optimal Networks Corp., EcoSCOPE from Compuware Corp., and Visual OnRamp from Visual Networks, Inc. These network management tools typically provide information such as packet loss, bit rates, and network utilization. This type of information may be helpful in fixing a network problem after the problem has been identified. However, as with the passive system monitors, these tools generally do not reflect network performance as experienced by a user. These tools are passive, in that they generally watch the network traffic which traverses a network segment or link, rather than actively creating traffic.

Passive network monitors sometimes include a basic scheduler to collect sample data from their data sources. A basic scheduler generally merely specifies the frequency (e.g., once every 15 minutes) at which the management console of the monitor should collect data from the data sources. Passive monitors are limited in that they are typically expensive to scale, only see traffic that is on the network at the time and do not recognize new or custom application traffic. Furthermore, it is difficult, if not impossible, to get a total end-to-end view of network performance from the sum of the individual elements as observed by passive monitors.

All of these approaches are limited in their ability to track network performance on a continuing basis in a manner which will reflect that performance from an end user perspective across a variety of hardware, operating systems and end user specific application programs while supporting multiple network protocols under actual operating conditions. This creates particular problems as networks are typically not static as new hardware and software application programs may be periodically added thereby changing the traffic characteristics on the network and the end user's experience of network performance. This changing environment also makes it difficult if not impossible for any of these known tools to provide repeatable measurements over time for use in assessing changes in network performance while improving the efficiency of IT staffs rather than increasing their workload. It is increasingly important to analyze the actual performance of the network to be tested without the constraints and limitations of these existing tools. It would also be beneficial to provide for automated evaluation of the acceptability of monitored performance of the network.

SUMMARY OF THE INVENTION

Accordingly, it is an object of the present invention to provide network performance testing methods, systems and computer program products which can provide network managers the ability to test the performance of a network in an ongoing manner.

It is a further object of the present invention to provide such network performance methods, systems and computer program products which can have flexibility in how and when network performance testing is executed.

It is a further object of the present invention to provide such network performance methods, systems and computer program products which can determine if performance is acceptable.

These and other objects are provided by systems, methods and computer program products which test network performance by defining test schedules including test protocols to be implemented and when the protocols should be executed for a plurality of defined connections on a network. A connection may be defined between two endpoint nodes on the network. At times specified in the test schedule, the endpoint node pair executes the test protocol and measures the performance of the network connection between the two nodes without requiring any involvement of application software which may or may not be installed on the computer hardware supporting the endpoint node. The test protocol may define the type of network layer protocol to utilize (for example, TCP), and the test script or scripts to be communicated using the appropriate network protocol stack on the computer hardware supporting the endpoint node. The schedule may be provided with an expiration date and a console node is provided for distribution of test schedules, monitoring of availability of endpoint nodes and receipt of measured performance measurements for reporting to a network manager. In further aspects of the present invention, auto-thresholding and coordination of interrelated but asynchronous tasks executing at the console node are provided.

The present invention provides a unique approach to network testing which may provide consistent and repeatable measurements. IT staffs are provided the capability to define schedules, distribute complex tests to endpoints to test connections without regard to the end user application programs available at particular endpoints, and automate periodic performance testing. Network management may thereby be separated from the separate and often challenging problem of application program management in a network environment. Network test results may encompass an end-to-end view and may further break network performance analysis down into its components, such as client, server, application, and network time, to potentially quickly and accurately isolate problems. This, in turn, may reduce downtime and provide better service to end users while increasing the efficiency of IT staffs.

In one embodiment of the present, a method is provided for testing the performance of a communications network including a plurality of endpoint nodes. A console node residing on a computer is added to the network. A connection associated with at least one of the endpoint nodes and a test schedule for the connection are defined at the console node and the test schedule is communicated to the associated endpoint node from the console node. Network performance test results are received at the console node from the endpoint node based on the test schedules. The connection definition may include defining a network communication test protocol based on a type of application communication traffic expected on the network and may further may include defining an endpoint node specific test protocol between the at least one endpoint node and an associated second endpoint node to simulate communications traffic therebetween to be tested.

In a further embodiment of the present invention, a performance threshold may be defined for the connection and an action may be defined to be taken responsive to a detected violation of the performance threshold. The performance threshold may be an auto-threshold wherein the performance threshold is determined based on determinations of a selected performance characteristic from obtained network performance test results. In one embodiment of the auto-thresholding aspect of the present invention, the auto-threshold provides a first detection criteria establishing the performance threshold for the connection if the connection has a first standard deviation for the selected performance characteristic and a second detection criteria establishing the performance threshold for the connection if the connection has a second standard deviation for the selected performance characteristic, the first standard deviation exceeding a selected standard deviation and the second standard deviation being less than the selected standard deviation.

In another embodiment of the present invention, a plurality of connections associated with the plurality of endpoint nodes are defined. Each of the plurality of connections is associated with a pair of the plurality of endpoint nodes and defines an endpoint node specific test protocol between the pair of the plurality of endpoint nodes to simulate communications traffic therebetween to be tested. A test schedule is defined for each of the plurality of connections, each test schedule including a start time for initiating execution of the associated endpoint node specific test protocol and a repeat schedule for re-initiating execution of the associated endpoint node specific test protocol. The test schedule may also include an expiration time for terminating re-initiating execution of the associated endpoint node specific test protocol. The test schedules, including the endpoint node specific test protocols associated with each of the test schedules, are then transmitted to at least one of the associated pair of the plurality of endpoint nodes for each test schedule.

In a further embodiment of the present invention, network performance results are received at the console node over the network from at least one of the associated pair of the plurality of endpoint nodes based on measurements from execution of the associated endpoint node specific test protocol. The network performance results may be received at time intervals based on the associated test schedule of the connection associated with the at least one of the associated pair of the plurality of endpoint nodes. The console node may also re-connect with the at least one of the associated pair of the plurality of endpoint nodes if network performance results are not received from the at least one of the associated pair of the plurality of endpoint nodes within a criteria time interval after expiration of one of the time intervals at which results were expected. An error may be indicated by the console node if it is unable to re-connect with the at least one of the associated pair of the plurality of endpoint nodes after a selected number of attempts to re-connect.

In one embodiment of the present invention, one of the endpoint nodes of a connection receives the test schedule and executes the endpoint node specific test protocol over the network between the at least one endpoint node and the associated second endpoint node at a start time for initiating execution specified in the test schedule. The endpoint node further monitors the performance of the network while the endpoint node specific test protocol is executed to obtain the network performance test results and communicates the network performance test results to the console node over the network. The executing, monitoring and communicating operations are repeated at a repeat time for re-initiating execution specified in the test schedule. The network performance test results may be communicated at a selected time following completion of the monitoring step.

While the invention has been described above primarily with reference to the method aspects of the present invention, it is to be understood that the present invention may also be embodied as systems and computer program products.

Accordingly, the systems, methods and computer program products of the present invention can provide a capability to test networks on an ongoing basis, under selectable operating conditions not provided by existing network performance testing tools. Test protocols for different connections may be designed to reflect expected operating conditions including the flexibility to provide distinct endpoint specific test protocols to different endpoints or endpoint node pairs associated with a connection which then execute their individual protocols pursuant to the provided test schedules. Performance results from each execution of a test protocol under a test schedule may be reported back to a console node for analysis. No specialized hardware is required and tests can be readily expanded without a corresponding increase in hardware costs. Network testing schedules can be established and executed without further operator intervention. In addition, performance thresholds may be implemented with actions triggered when thresholds are violated. The present invention thereby provides network managers with an improved tool for designing and managing complex computer networks handling a variety of network protocols, hardware and applications traffic.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, data processing systems (apparatus) and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including semiconductor devices, hard disks, CD-ROMs, optical storage devices, or magnetic storage devices.

It is also to be understood that the present invention may be provided by combinations of steps for performing the specified functions and program instruction means for performing the specified functions. It will also be understood that these functions can be implemented by special purpose hardware-based computer systems which perform the specified functions or steps, or combinations of special purpose hardware and computer instructions.

Figure 1:
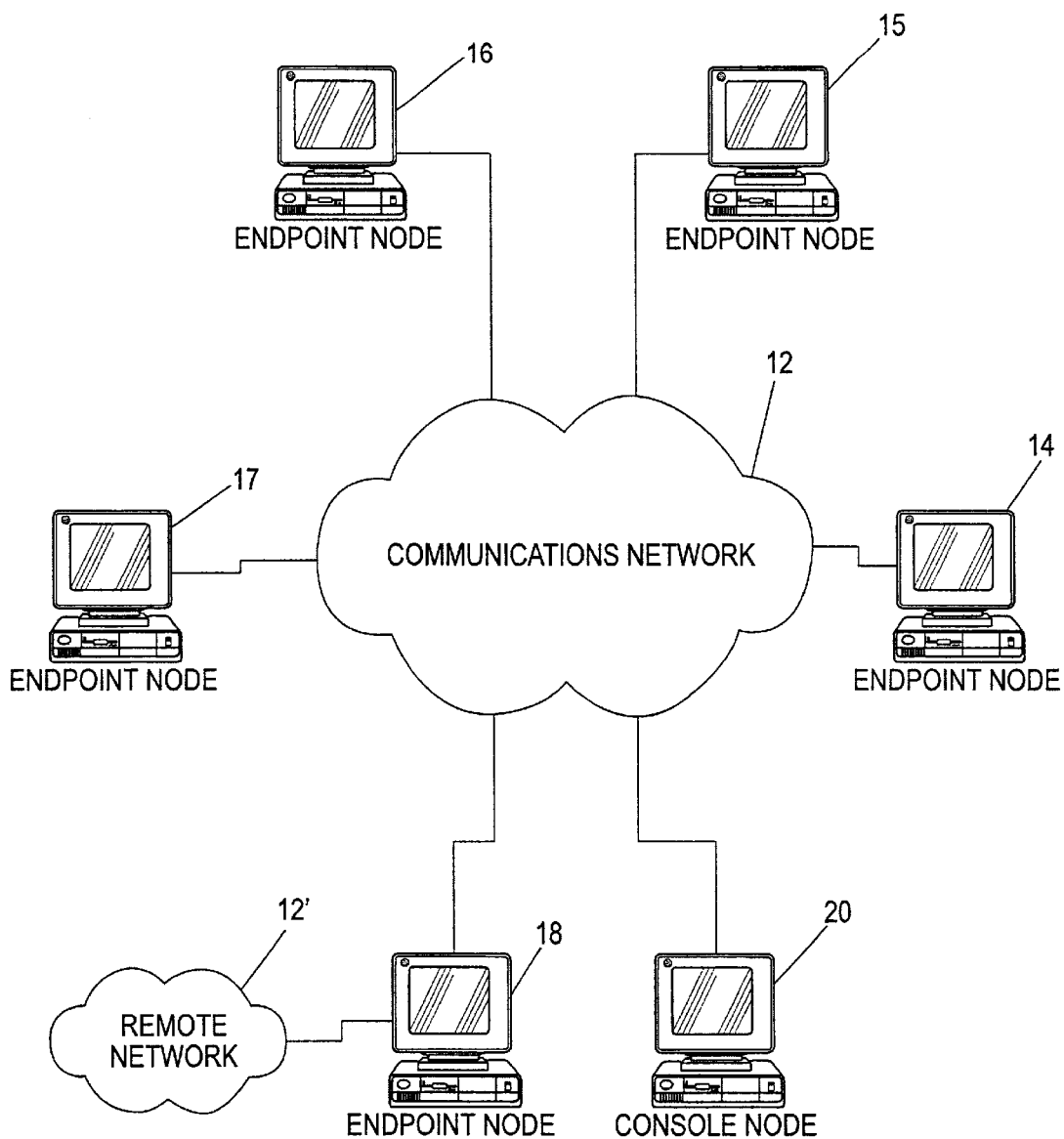
FIG. 1 schematically illustrates a hardware and software environment in which the present invention can operate.

Referring now to FIG. 1, a hardware and software environment in which the present invention can operate will now be described. As shown in FIG. 1, the present invention includes methods, systems and computer program products for testing the performance of a communications network 12. Communications network 12 provides a communication link between endpoint nodes 14, 15, 16, 17, 18 and console node 20.

As will be understood by those having skill in the art, a communications network 12 may be comprised of a plurality of separate linked physical communication networks which, using a protocol such as the Internet protocol (IP), may appear to be a single seamless communications network to user application programs. For example, as illustrated in FIG. 1, remote network 12' and communications network 12 may both include a communication node at endpoint node 18. Accordingly, additional endpoint nodes (not shown) on remote network 12' may be made available for communications from endpoint nodes 14, 15, 16, 17. It is further to be understood that, while for illustration purposes in FIG. 1, communications network 12 is shown as a single network it may be comprised of a plurality of separate interconnected physical networks or partitioned sections of a physical network. As illustrated in FIG. 1, endpoint nodes 14, 15, 16, 17, 18 may reside on a computer. As illustrated by endpoint node 18, a single computer hardware system may comprise multiple endpoint nodes. However, for purposes of simplifying the description herein, endpoint nodes and associated hardware will be generally referred to as a unitary element unless referred to otherwise. Performance testing of the present invention as illustrated in FIG. 1 further includes a designated console node 20. The present invention tests the performance of communications network 12 by the scheduled execution of test protocols between the various endpoint nodes 14, 15, 16, 17, 18 over communications network 12.

Figure 2:
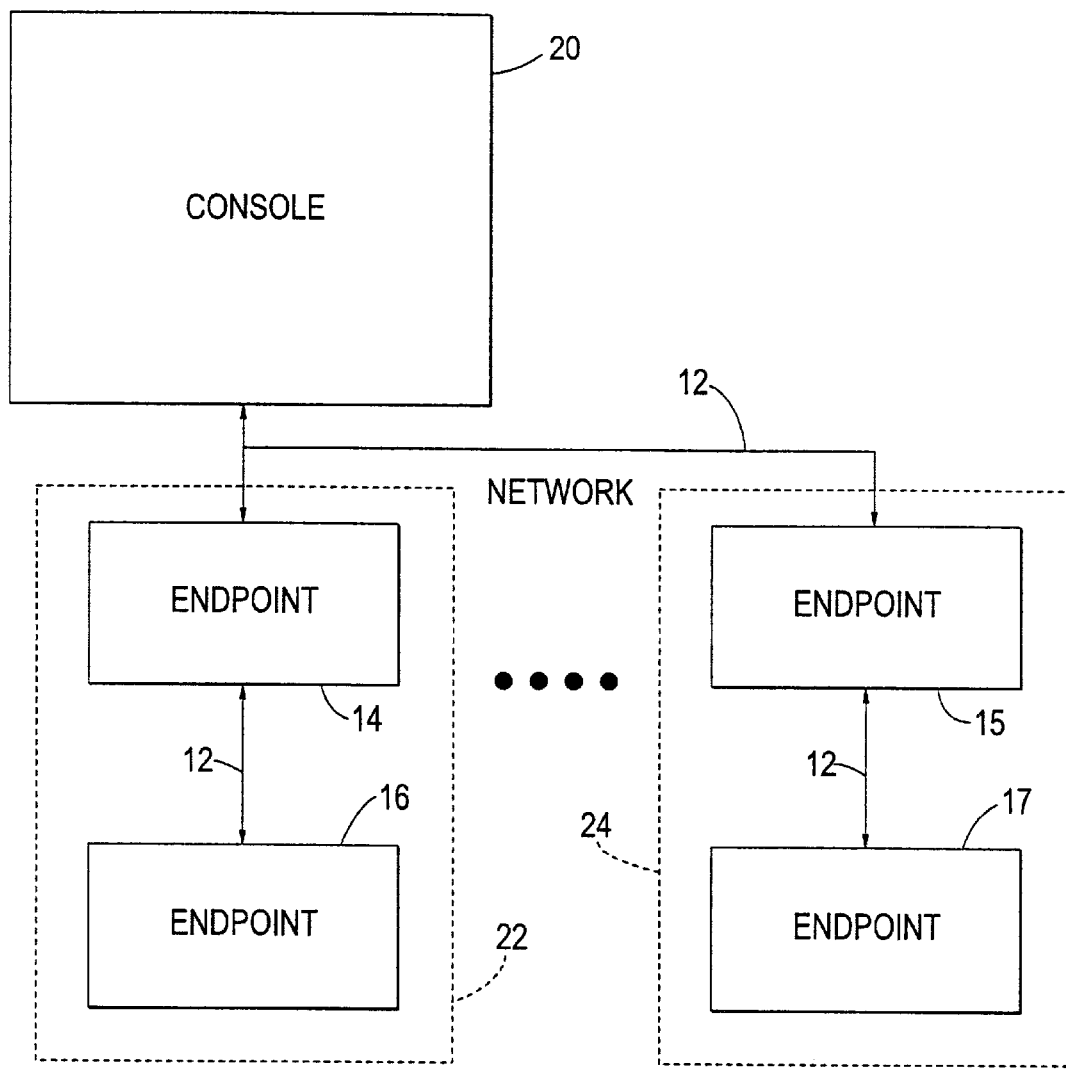
FIG. 2 is a block diagram of an embodiment of communications network performance testing according to the present invention.

As illustrated in the embodiment shown in the block diagram of FIG. 2, application communication traffic may be simulated by communications between associated endpoint node pairs 22, 24. As illustrated in FIG. 2, endpoint node 14 and associated endpoint node 16 define a first endpoint node pair 22 associated with a first connection therebetween. Similarly, endpoint node 15 and associated endpoint node 17 define a second endpoint node pair 24 associated with a second connection. While it is preferred that application communication traffic be simulated by endpoint node pairs as illustrated in FIG. 2, it is to be understood that console node 20 may also perform as an endpoint node for purposes of a performance test. It is also to be understood that an endpoint node may be associated with a plurality of additional endpoint nodes to define a plurality of endpoint node pairs each associated with a connection each of which is provided a test schedule according to the teachings of the present invention.

Console node 20 obtains user input, for example by keyed input to a computer terminal or through a passive monitor, to define connections associated with pairs of endpoint nodes and a test schedule for each connection to test network 12. Console node 20, or other defining means defines a test schedule including a test protocol for the connections to simulate communications traffic between a plurality of selected endpoint nodes 14, 15, 16, 17, 18. Preferably, the test protocol is an endpoint pair based test protocol. Each endpoint node 14, 15, 16, 17, 18 is provided endpoint node information including an endpoint node specific network communication test protocol for the connection and the associated test schedule. The endpoint node information may also include result reporting frequency, connection ID, endpoint 1 requirements, endpoint 2 requirements, threshold critical values and threshold normal values. Preferably, the network communication test protocols are based on a type of application communication traffic expected to provide a test protocol which simulates application communication traffic. Console node 20, or other defining means, defines the connections and the test schedule for each connection including specifying the endpoint nodes associated with the connection and the underlying test protocols. Test protocols contain information about a performance test including what test scripts and network protocol to use for communications between each endpoint pair 22, 24 defining connections. A given test protocol may include a plurality of different test scripts. Examples of test protocols and methods for using test protocols in network performance testing suitable for use with the present invention are described in U.S. Pat. No. 5,838,919 titled "Methods, Systems and Computer Program Products for Endpoint Pair Based Communications Network Performance Testing" which is incorporated herein by reference in its entirety.

A test schedule may be based on a calendar cycle. A different repeat schedule may then be provided for different days. For example, a schedule could initiate execution of a test protocol every 15 minutes from 8 am–12 pm and 1 pm–5 pm on Mondays and Tuesdays and from 8 am–5 pm on Wednesdays and Fridays. The test schedule thereby provides a start time for initiating execution of the test protocol and a repeat schedule for re-initiating execution of the test protocol. The schedule may then be set to expire, for example, after two weeks, unless a new schedule is received.

In one embodiment of the present invention, as illustrated in FIG. 2, a test schedule with endpoint information including an endpoint node specific test protocol including a test script is provided first to a single endpoint node 14, 15 in each endpoint pair 22, 24. Endpoint 1 nodes 14, 15 insure that they can communicate with their respective endpoint node partners 16, 17. The endpoint 1 nodes 14, 15 then communicate an associated partner endpoint node test protocol to their respective endpoint node partners (endpoint 2 nodes) 16, 17. The associated partner endpoint node test protocol may be transmitted each time the test protocol is executed pursuant to the test schedule, thereby treating the endpoint node partners 16, 17 as if they have never previously received the protocol and relieving the endpoint node partners 16, 17 of the need to maintain previously received protocols. Alternatively, network traffic may be reduced by saving the previously transmitted associated partner endpoint node test protocol at the endpoint node partners 16, 17 and transmitting an initiate request to the endpoint node partners 16, 17 when the endpoint 1 nodes 14, 15 determine from the schedule that execution is required.

In a further alternative embodiment, endpoint 1 nodes 14, 15 may determine a corresponding test schedule including a partner endpoint node test protocol from received test schedule and communicate that to endpoint 2 nodes 16, 17. It is to be understood that the partner test schedule including the partner endpoint node test protocol may alternatively be determined and communicated to endpoint 2 nodes 16, 17 from console node 20.

In practicing the present invention, network performance test results are generally based upon timing measurements. Accordingly, as each endpoint node pair 22, 24 reaches predetermined checkpoints within a script, it creates timing records. The timing records may be returned to console node 20 which may use them to analyze the performance of communications network 12 by calculating statistics. Preferably, the endpoint nodes (or one of each pair) calculate performance test results from the timing measurement and report the calculated results periodically to console node 20. Network performance test results may include throughput, transaction rate and response time.

The test schedules, in addition to providing test protocols, provide a schedule for each connection. The schedule preferrably specifies the start time for initiating execution of the associated test protocol and a repeat schedule for re-initiating execution of the associated protocol. An expiration time may also be included for terminating re-execution of the associated test protocol to allow independently operating endpoint notes to age out a schedule to avoid unintended burdening of a network 12 with test traffic. The test schedules of the different connections may, optionally, be coordinated to test particular combinations of test protocols concurrently executing over communication network 12.

Console node 20 or other means for analyzing, provides means for analyzing reported network performance test results from endpoint node 14 or other selected reporting endpoint nodes 15, 16, 17, 18 to generate performance measurements. Performance measurements may include throughput and transaction rate. Response time may also be generated as a performance measurement. Alternatively, endpoint node 14, 15, 16, 17, 18 may analyze network data for a connection and provide the performance measurement to console node 20 as the network performance test results.

Console node 20, or other means for detecting communications capabilities, may detect communications capabilities of endpoint node 14, 15, 16, 17, 18 before establishing a connection and a test schedule using endpoint node 14, 15, 16, 17, 18. A pre-setup flow may be sent from console node 20 to each endpoint node 14, 15, 16, 17, 18 identified as part of a connection. The presetup flow may include a requirements list. The requirements list may include a string of bytes which indicate what communications capabilities endpoint node 14, 15, 16, 17, 18 need to support in order to execute their endpoint node specific test protocol under the test schedule. For example, if a test protocol uses Advanced Program to Program Communication (APPC) as the network protocol between an endpoint node pair 22 and the test script involves short connections, the endpoint nodes of endpoint node pair 22 should support the following items which would be in the requirements list: APPC, and Multiple Accept (an optional feature of APPC which allows back-to-back conversations).

Each endpoint node 14, 15, 16, 17, 18 looks at the items in the received requirements list. If it supports these items, it responds positively to the presetup flow. Otherwise, it responds negatively and may return a list of the items it does not support. The returned information may be used by console node 20 for user diagnostics and the definition of a connection may be modified.

Figure 3:
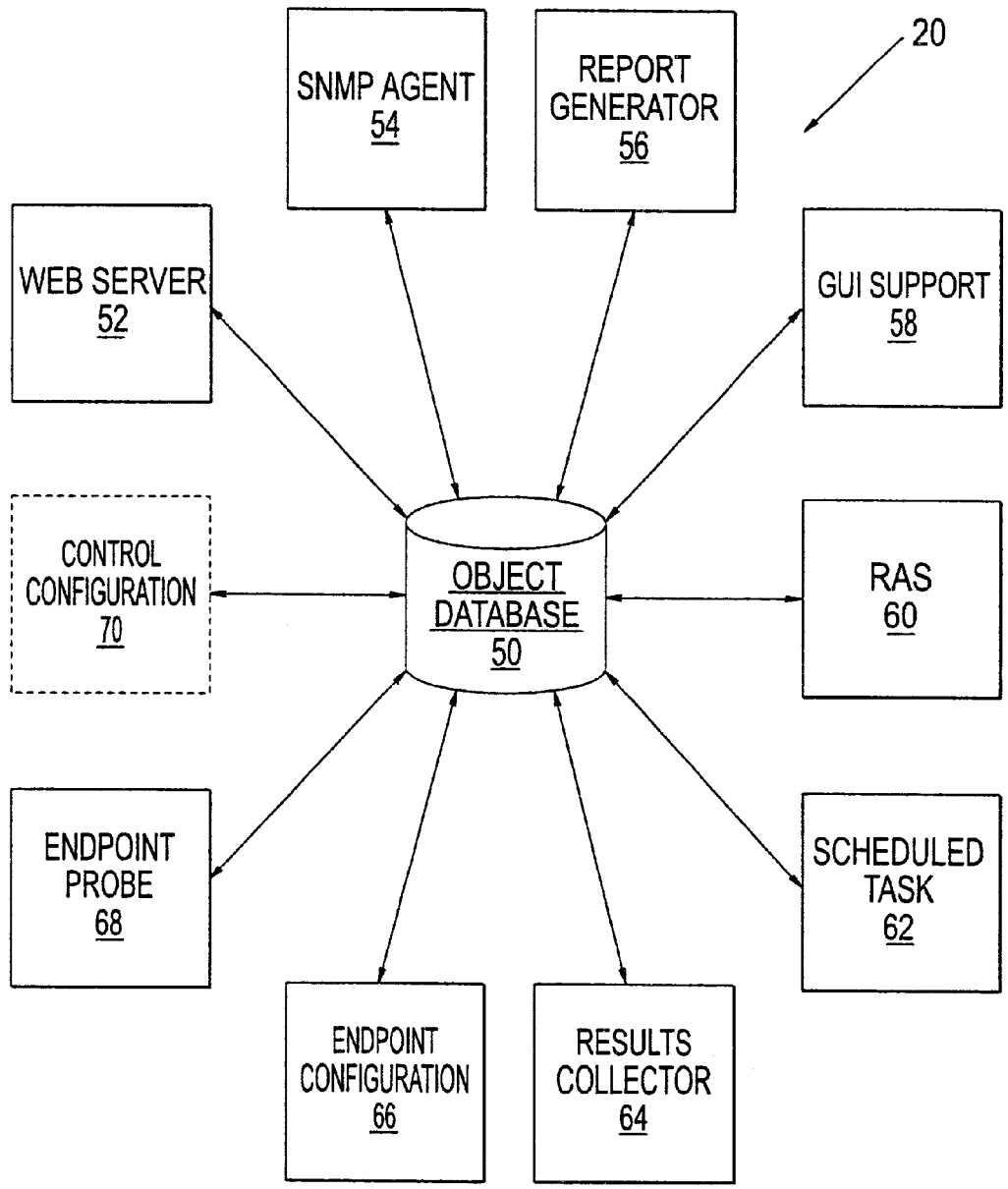
FIG. 3 is a block diagram of an embodiment of a console node according to the present invention.

Referring now to FIG. 3, the various modules of a network testing system of console node 20 will be further described for an embodiment of the present invention. As shown in FIG. 3, console 20 includes numerous functional blocks (or agents) maybe implemented as separately executed but interrelated code threads, interfacing with object oriented database 50. In general, the various functional blocks will be provided as a console engine executing on the computer hardware in which console node 20 is implemented. However, to simplify the discussion, the engine, node and hardware will generally just be referred to as console node 20 unless otherwise stated. A suitable object oriented database for use with the present invention is the POET™ database available from POET Software Inc. Object oriented database 50 provides storage for configuration data and performance results. Also shown in the embodiment of FIG. 3 is web server 52. Web server 52 provides a communication interface between console node 20 and users (such as a network administrator) for generating reports responsive to user requests. Web server 52 may be provided using a commercially available web servers.

Simple Network Management Protocol (SNMP) agent 54 is responsible for providing control to allow the control node 20 to operate as a SNMP node which may utilize standard interface protocols allowing other network management tools which may be used by a network administrator to interface with the management information base generated by the performance management systems of the present invention. Preferably, the SNMP agent 54 is established to support read only access to the management information base of object database 50. The SNMP agent 54 may allow access to configuration information related to the endpoints, test results and event reports generated by the network performance system of the present invention.

Also shown in FIG. 3 is report generator 56. Report generator 56 generates reports responsive to report requests which are either automatically generated for scheduled reports or responsive to specific user requests. Report generator 56 may also provide the capabilities for formatting and printing the reports. A reporting tool suitable for use with the present invention is the Crystal Reports program available from Seagate Software. Preferably, consistent with the use of web browser and Java based techniques according to a preferred embodiment of the present invention, reports are generated in a Hyper-Text Markup Language (HTML) format.

Also shown in FIG. 3 is GUI (graphical user interface) support agent 58. GUI support agent 58 is responsible for insulating the details of the performance monitoring agents operations on control node 20 from control configuration agent 70. As will be described further, when control configuration agent 70 forwards changes, they are received by GUI support agent 58 from object database 50 and forwarded to the appropriate respective agents of the control node 20 for implementation and processing. The GUI support agent 58 is responsible for processing modifications, additions or deletions of objects in object database 50 responsive to user inputs from a GUI such as request from a user through control configuration agent 70. GUI support agent 58 both processes changes to the objects for the database 50 and further places appropriate objects into the work queues of other agents illustrated in FIG. 3 as appropriate to implement and track changes to schedules or connections which flow from the user requested changes. It is to be understood that, as used herein, a "work queue" is an ordered list of tasks to be performed by an associated agent.

RAS agent 60 is responsible for starting all performance monitoring system processes of console node 20 and monitoring their status. If any process agent fails abnormally, the RAS agent 60 restarts the failed agent. RAS agent 60 provides further reliability, availability and serviceability capability to the systems of the present invention. RAS agent 60 is preferably responsible for starting the other agents illustrated in FIG. 3, monitoring the ongoing operations of the other agents and restarting agents when they fail. RAS agent 60 may also be responsible for generating error message traps if continued failures occur even after restarts. As an additional feature, the RAS agent 60 may provide for restart of all system agents 52–70 illustrated in FIG. 3 on a periodic basis, such as weekly, to reduce error conditions. RAS agent 60 may also initiate full system restarts (ire. including, for example, the operating system). RAS agent 60 may further provide for generating error messages and/or SNMP traps when disk space for object database 50 goes below minimum levels.

Scheduled task agent 62 is responsible for performing tasks that need to be executed based on a determined schedule. Examplary tasks performed by scheduled task agent 62 in various embodiments of the present invention include invoking the sending of updated schedules for all active connections on a weekly basis, such as Sunday morning at an early hour when the network is unlikely to be experiencing significant user traffic. Other functions which may be provided by scheduled task agent 62 include generation of schedule periodic reports by submitting requests to report generator 56, computation of daily and monthly result summaries from results stored on object database 50, computation of automatic thresholds and determining if endpoint nodes 14, 15, 16, 17, 18 have failed to contact the console node 20 as expected.

Results collector agent 64 receives test results from endpoint nodes 14, 15, 16, 17, 18. The results may be timing records of a successful test or an indication that a test failed to run. Result collector agent 64 may be implemented as a plurality of threads executing on control node 20 to support inbound connections from a plurality of endpoint nodes 14, 15, 16, 17, 18. Different threads can be provided to support different network protocols for various endpoint nodes 14, 15, 16, 17, 18 such as APPC, SPX or TCP. Received results may be parsed and stored in object database 50. In addition, results collector agent 64 may provide for updating of results summaries in object database 50 if results from any connections are untimely received after the summaries for a given period have already been calculated. Different threads may be initiated to support each endpoint node 14, 15, 16, 17, 18 actively transferring results to console node 20.

Results collector agent 64 can further provide means to detect errors in data transfers whether from a communication problem or because of errors encountered during the test itself.

In addition, if an endpoint node 14, 15, 16, 17, 18 reports a failure or threshold crossing results collector agent 64 may perform specified actions as appropriate for the reported error condition. Appropriate actions, as will be described later, include sending SNMP traps to other network applications through SNMP agent 54 or executing a command locally on console node 20. A separate threshold crossing thread is provided in results collector 64 to handle processing of input results indicating violation of any threshold criteria by a threshold crossing event.

Endpoint configuration agent 66 is responsible for delivering test schedules to endpoint nodes 14, 15, 16, 17, 18. Related functions may include computing and distributing schedules and updating schedules on a periodic basis. Furthermore, endpoint configuration agent 66 may be responsible for detecting and marking individual endpoint nodes 14, 15, 16, 17, 18 as being in an inoperative condition when an endpoint node 14, 15, 16, 17, 18 cannot be successfully contacted. For example, this may be done after iteratively trying to establish a connection between console node 20 and the endpoint node 14, 15, 16, 17, 18 using each available alternative communication protocol and device address without establishing a successful connection to the individual endpoint node 14, 15, 16, 17, 18. Endpoint configuration agent 66 may also monitor the status of various endpoint nodes 14, 15, 16, 17, 18 by computing a reporting period for each endpoint node 14, 15, 16, 17, 18 based on the test schedules and placing appropriate information in object database 50 to indicate to other agents when network performance test results should be expected from particular endpoint nodes 14, 15, 16, 17, 18 and associated connections. Endpoint configuration agent 66 may further detect and report when an endpoint pair 22, 24 is invalid if an individual one of the endpoint pair 22, 24 reports in with an indication that it is unable to establish a connection with its established endpoint pair for a particular connection.

Endpoint probe agent 68 is responsible for contacting endpoint nodes 14, 15, 16, 17, 18 that are in an inoperative condition. Endpoint probe agent 68 periodically attempts to contact inoperative endpoint nodes 14, 15, 16, 17, 18 until they can be reached or removed from object database 50 as an active endpoint node 14, 15, 16, 17, 18. Endpoint probe agent 68 may also be provided the capability to automatically assess configuration information about prospective endpoint nodes 14, 15, 16, 17, 18, such as protocols supported, addresses, operating systems and so on, when new endpoint nodes 14, 15, 16, 17, 18 are identified and added to object database 50. Endpoint probe agent 68 further may periodically attempt to contact inoperative endpoint nodes 14, 15, 16, 17, 18 until they can be returned to an active condition.

As described with endpoint configuration information collection, endpoint probe agent 68 preferably attempts to establish contact with inoperative endpoint nodes 14, 15, 16, 17, 18 using all available known communication protocols and addresses. Once an endpoint node 14, 15, 16, 17, 18 is successfully contacted, endpoint probe agent 68 retrieves the endpoint configuration information and updates object database 50 to establish that it is no longer an inoperative endpoint node 14, 15, 16, 17, 18. Preferably, the frequency of attempts to contact an inoperative endpoint node 14, 15, 16, 17, 18 goes down the longer an endpoint node 14, 15, 16, 17, 18 stays inoperative. However, it is preferred that endpoint probe agent 68 attempt to contact any inoperative endpoint nodes 14, 15, 16, 17, 18 at least one time per day. As with various of the other agents of FIG. 3 discussed herein, endpoint probe agent 68 may be provided with the capability to perform actions, such as SNMP traps or executing a command, responsive to conditions, such as an inoperative endpoint node 14, 15, 16, 17, 18.

Also shown in FIG. 3 is control configuration agent 70. As illustrated by the dotted line used for control configuration agent 70 in FIG. 3, it is preferred that this agent be executed remotely from the system on which object database 50 resides. This allows the actual database hardware of console node 20 to be placed in a secure area with remote user access to change system parameters. Preferably, control configuration agent 70 is provided as a Java application executing on a remote device in communication with console node 20. As will be described more fully herein with respect to the operations of the present invention, the control configuration agent 70 can provide for input of configuration information for various aspects of test operations according to the present invention such as definition of endpoints and endpoint pairs, thresholds, actions, schedules, test scripts, department and location definitions, security protocols, reporting procedures, SNMP definition, system defaults and user defaults. Control configuration agent 70 further may provide for input of status change requests with respect to various endpoint nodes 14, 15, 16, 17, 18 or endpoint pairs 22, 24 such as taking a particular endpoint node 14, 15, 16, 17, 18 off of active status.

While illustrated in FIG. 3 as connected directly to object database 50, changes to the object database 50 may not be directly implemented by control configuration agent 70. Rather, GUI support agent 58 can provide an interface allowing changes to be implemented based on requests from control configuration agent 70, on an asynchronous basis, as various other agents perform their associated functions to change the status of devices and protocols within the network performance test schedules. Accordingly, the direct connection of control configuration agent 70 to object database 50 illustrates the placement of information on the database which may then be retrieved by GUI support agent 58 for processing and implementation. As will be described later herein, in one aspect of the present invention, a unique approach is provided for handling the asynchronous state transitions between requested changes and implementation of the changes across the affected nodes of the computer network 12.

The various agents illustrated in FIG. 3 may generally be referred to as the console engine of a network performance system according to the present invention. As described with respect to FIG. 3, however, the console engine executing on console node 20 is preferably implemented as a variety of code threads independently executing and performing different functions through coordinated usage of object database 50. Similarly, an endpoint engine is provided and executed on each of the devices supporting endpoint nodes 14, 15, 16, 17, 18 to implement the endpoint node functions according to the present invention. Endpoint nodes 14, 15, 16, 17, 18 suitable for use with the present invention, as noted above, are described in U.S. Pat. No. 5,838,919. However, unlike the endpoint engines described in the '919 patent, the endpoint engines of the present invention are not required to operate in a synchronized manner across a plurality of endpoint pairs carrying out a test scenario simultaneously. Instead, endpoint engines according to the present invention can provide for independent scheduling and initiation of test protocols responsive to a test schedule provided to the endpoint engines from the control node engine of FIG. 3. Therefore, the particular information processing by an endpoint engine according to the present invention may vary from that disclosed in the '919 patent.

Endpoint engines executing on endpoint nodes 14, 15, 16, 17, 18 respectively receive test schedules and store the received test schedules in memory available to endpoint nodes 14, 15, 16, 17, 18. They further initiate execution of tests based on the stored schedules, monitor performance during the tests and collect results from the tests. The results are stored until the appropriate time for a batch or event driven reporting of results to control node 20. In addition, as will be described further herein, endpoint engines of the present invention preferably generate and calculate network performance results locally from measurements during tests and further provide for comparison of the calculated network performance results to threshold criteria value. The endpoint engine on endpoint nodes 14, 15, 16, 17, 18 is further responsible for reporting endpoint configuration information responsive to requests from control node 20 and for performing pre-setup and setup operations between respective endpoint nodes 14, 15, 16, 17, 18 defining an endpoint node pair for a particular connection. Endpoint engines according to the present invention otherwise may provide capabilities in a manner described in the '919 patent. In any event, as noted previously, for simplicity, endpoint engines will not generally be distinguished from endpoint nodes 14, 15, 16, 17, 18 herein.

Figure 4:
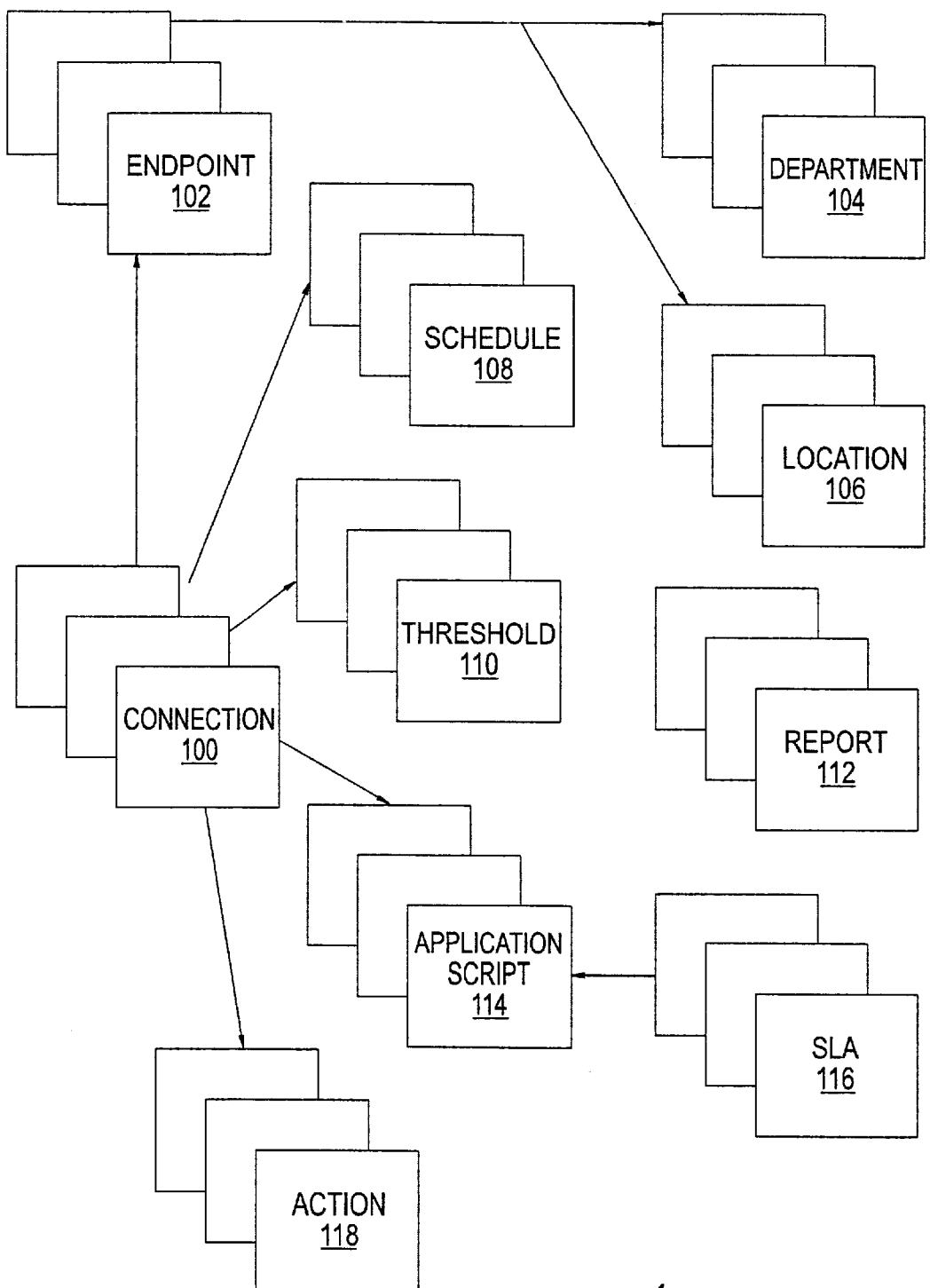
FIG. 4 is an illustration of entity types and relationships according to an embodiment of the present invention.

Referring now to FIG. 4, the relationship and characteristics of the various objects in object database 50 will now be further described for an embodiment of the present invention. The different object types will be referred to herein as named entities or named entity types. Each of the various named entities illustrated in FIG. 4 may be configured by a user through control configuration agent 70. Referring first to connection entity 100, connections refer to the point to point communication link which will be tested using various test protocols. Each connection entity 100 may include a variety of associated information including endpoint one, endpoint two, schedule, threshold, application script, threshold action and connection action. Each of the associated values for a connection entity 100 may be a pointer to another named entity contained in object database 50.

As shown in FIG. 4, a plurality of connection entities 100 may be maintained in object database 50. The endpoint one and endpoint two values contained for a given connection entity 100 refer to specific endpoint named entities 102 in object database 50. Each endpoint entity 102 represents an installed instance of an endpoint engine program on one of the endpoint nodes 14, 15, 16, 17, 18 connected to the network 12 to be tested. Any individual endpoint entity 102 may support multiple communication protocols and addresses, such as Internet addresses. The limitations on an individual endpoint entity 102 may depend upon the hardware characteristics of the associated endpoint node device 14, 15, 16, 17, 18. As noted above, it is to be understood that any given endpoint hardware device may support a plurality of endpoint nodes 14, 15, 16, 17, 18 on the network 12. Furthermore, depending upon installed hardware, the various endpoint nodes 14, 15, 16, 17, 18 active on a given hardware device may support different communication protocols and be associated with different addresses, such as Internet addresses. Accordingly, an endpoint entity 102 is preferably provided in object database 50 for each active endpoint node 14, 15, 16, 17, 18 on the network 12.

As noted, each connection entity 100 will be associated with two different endpoint entities 102. Furthermore, any individual endpoint entity 102 may be associated with more than one connection entity 100. Each endpoint entity 102 may, in turn, be associated with a department entity 104 and a location entity 106. The department entity 104 and location entity 106 can provide for discrimination between endpoints based upon criteria established by the network administrator.

The schedule entities 108 define time periods during the week and a repeat interval when the associated connection entities 100 should be monitored. Schedules may be provided allowing for weekly, monthly or other repeat periods including specification of individual days, such as holidays, which are exceptions to the periodic repeat schedule. Each connection entity 100 is associated with one schedule entity 108. However, any given schedule entity 108 may be associated with a plurality of connection entities 100.

Threshold entities 110 are also illustrated in the embodiment of FIG. 4 and are associated with the thresholding aspect of the present invention. Each threshold entity 110 represents a desired performance level standard/criteria. Each connection entity 100 may be associated with one or more threshold entities 110. For example, separate threshold entities 110, both associated with a single connection entity 100, may be provided for fixed and auto thresholds as will be described further later herein. Any given threshold entity 110 may be associated with a plurality of connection entities 100. Furthermore, as will be described further herein, a threshold 110 may specify an automatic or fixed threshold.

Application script entities 114 represent the network flows of a test protocol to be implemented under the test schedule at specified times between the endpoint nodes 14, 15, 16, 17, 18 specified by an associated connection entity 100. Examplary application scripts suitable for use in testing a connection entity 100 are further described in the '919 patent. An application script entity 114 may be associated with a plurality of different connections entities 100. Typically, an individual connection entity 100 will be associated with a single application script entity 114 but may be associated with more.

An SLA entity 116 represent service level agreements. A system user can define network performance and availability service level agreements (SLA) for use in reporting performance. Generated reports may then be configured to report results against the configured service level agreement entities 116 and the specified performance parameter levels in the SLA. The report entities type 112 can contain user configured parameters defining reports available for generation to a printer and/or to a user requesting information through web server 52 in an HTML format. A service level agreement 116 may contain information including the following: the agreed upon service indicators, the workload and application-related performance indicators to be included (such as file transfer, transaction rate, etc.), modification procedures, duration of the contract, financial details, penalties for non-compliance, measurement tools accepted by the agreeing parties (such as procedure, monitoring interval, etc.) performance reports accepted by the agreeing parties, escalation procedures for deviations from agreement, point of contacts and frequency of execution function (such as recalculate service indicator every month, average computations for preceding periods, and so on). Typical network performance measurements used to support service level agreement analysis include network availability and performance. Various of these indicators may be readily provided by the present invention through its true end to end network performance analysis independent of other factors such as the performance of application programs from various vendors. Available measurements may include up-time (measurement of percentage of time that a network connection was operational over a given period of time), error rate (measurement of the number of errors relative to total transactions for a specific connection over a given period of time), response time (measurement of time interval it takes for two endpoints to complete a given operation) and throughput (measurement of quantities of data carried between two endpoints minus the protocol overhead over a given period of time). The present invention also provides measured data in a format suitable for deriving various performance measures such as running average response time (average of all response time measures for a given object), rolling average of response time (average of the previous N response time measures for a given object, where N is a constant) and threshold distance (the distance to and from a given threshold in terms of percentage of threshold value).

In a further aspect of the present invention, responsive actions are supported as defined by action entities 118. An action entity 118 is executed when the associated condition occurs. An action will typically include one of two operation types. First, an SNMP trap may be initiated and sent through SNMP agent 54 to a remote application for responsive action. For example, known network programs are available which trigger a page to a network support operator when network performance conditions fall below a specified level. The performance monitoring system of the present invention may be used to trigger a network error condition based upon the performance measurements from the present invention with an SNMP trap passed to the user's existing alarm system to page the appropriate network operator to take corrective action. Alternatively, an action entity 118 may specify execution of a command on console node 20. For example, when an external alarm system is available to a user, a modem can be installed on console node 20 and a program may be executed which automatically dials a pager for the network operator responsive to a detected condition on the network 12.

In addition to supporting database objects for system configuration and operation as illustrated in connection with FIGS. 3 and 4, object database 50 further provides for storage of results. Performance results using the present invention may generally be grouped and reported as performance and/or connection analysis. For a performance analysis of the network 12, an exemplary format for results storage in object database 50 is illustrated in Table 1.

TABLE 1

Performance Results

| Name | Description |
|---|---|
| Failure Cause | Provides failure information if the test failed. |
| Transaction_count | The number of transactions run as a part of the test. |
| Total_bytes | The total number of bytes that were sent and received. |
| Total_time | The total amount of time taken to run the test. |
| Is_above_threshold | Indicates if the run was above threshold. |
| Run_time | The date and time when the test was run. |

For each threshold crossing (i.e., a measurement failing a specified criteria or returning to a normal condition), the following is kept in the object database 50 as shown in Table 2:

TABLE 2

Threshold Crossing Data

| Name | Description |
|---|---|
| Critical_time | The date and time when the normal to critical crossing took place. |
| normal_time | The date and time when the critical to normal crossing took place. |
| threshold_value | The result value that caused the crossing. |
| critical_value | The value of the threshold. |
| max_crossing_distance | The max distance of runs during the crossing from the CriticalValue. |
| avg_crossing_distance | The average distance of the runs from the CriticalValue. |
| tests_above_threshold | The number of tests that were above the threshold. |

For report generation, it is preferred that object oriented database 50 export the performance results to a relational database, such as the Access database available from Microsoft Corporation. Offloading the results for report preparation improves performance as the object oriented database 50 typically will contain a very large number of performance results and provides a less efficient interface to the reporting package for accessing such results. Preferably, an interface is provided for using Access related tools provided with the object oriented database to extract the results and place them in a .MDB3 type database suitable for use with Access. This approach may be used for reporting out a performance analysis and also for reporting out a connection analyses as described below.

For a connection analysis, results of one connection entity 100 for requested time period may be extracted from the object database 50 and provided to Access (or another relational database). Connection analyses is preferably distinguished based upon the approach to analysis and gathering of the data for reporting rather than influencing the acquisition of the data itself. Accordingly, a given test schedule will be established and implemented regardless of whether the data is subsequently analyzed as a performance analysis or a connection analyses. An exemplary data format for a connection analysis is illustrated in Table 3 below.

TABLE 3

Connection Analysis Results

| Data Item | Description |
|---|---|
| The Request Table | Contains the information for a request. The information about the connection of the request is in this table. |
| RequestID | Unique ID for the request |
| RequestDateTime | The data and time of the request. |
| ConnID | The ID of the connection. Each connection has a unique connection ID. |
| ConnType | Whether a connection is a connectivity or performance connection. Connectivity connections do not have performance information in their results. |
| endpoint 1 Name | Name of endpoint 1. |
| endpoint 1 Address | Address of endpoint 1 used by this connection. |
| endpoint 2 Name | Name of endpoint 2. |
| endpoint 2 Address | Address of endpoint 2 used by this connection. |
| AppScriptName | Name of the application script configured for this connection. |
| ScheduleName | Name of the schedule for the connection. |
| Comment | User provided comment for the connection. |

TABLE 3-continued

Connection Analysis Results

| Data Item | Description |
|---|---|
| endpoint 1 Location | Location of endpoint 1. |
| endpoint 1 Department | Department of endpoint 1. |
| endpoint 2 Location | Location of endpoint 2. |
| endpoint 2 Department | Department of endpoint 2. |
| Protocol | Protocol used by the connection. |
| ThresholdName | Name of the threshold configured for the connections. |
| ThresholdType | Response time / throughput. |
| AutoThreshold | Whether the threshold is auto. |
| ThresholdValue | The current value of the threshold. |
| The Results table | Contains the results for all the connection analysis requests. |
| RequestID | The unique request that the result belongs to. |
| RunTime | Date and time of the run. |
| Failure | Whether the test ran successfully |
| FailureCause | If test failed, the cause of the failure. |
| TransactionCount | Transaction count |
| TotalBytes | Total bytes |
| TotalTime | Total time |
| AboveThreshold | Whether the run was above threshold |
| The Threshold Crossing table | Contains threshold crossings for the requests. |
| RequestID | The unique request that the threshold crossing belongs to. |
| RunTime | The date and time when the normal to critical crossing took place. |
| NormalTime | The date and time when the critical to normal crossing took place. |
| ThresholdValue | The result value that caused the crossing |
| CriticalValue | The value of the threshold |
| MaxCrossingDistance | The max distance of runs during the crossing from the CriticalValue |
| AvgCrossingDistance | The average distance of the runs from the CriticalValue. |
| TestsAboveThreshold | The number of tests that were above the threshold. |

In addition to performance reports in connection with analysis reports, periodic reports may beneficially be generated based on data acquired by the systems and methods of the present invention. For example, a 24 hour period periodic report could be generated by placing the following information in the relational database (.MDB) format as shown in Table 4.

TABLE 4

Periodic Report Results

| Data Item | Description |
|---|---|
| The Connections Table | Contains information about the configured connections. |
| ConnID | The ID of the connection. Each connection has a unique connection ID. |
| ConnType | Whether a connection is a connectivity or performance connection. Connectivity connections do not have performance information in their results. |
| endpoint 1 Name | Name of endpoint 1. |
| endpoint 1 Address | Address of endpoint 1 used by this connection. |
| endpoint 2 Name | Name of endpoint 2. |
| endpoint 2 Address | Address of endpoint 2 used by this connection. |
| AppScriptName | Name of the application script configured for this connection. |
| AppScriptID | A unique ID for the application script. |
| ScheduleName | Name of the schedule for the connection. |
| Comment | User provided comment for the connection. |
| endpoint 1 Location | Location of endpoint 1. |
| endpoint 1 Department | Department of endpoint 1. |
| endpoint 2 Location | Location of endpoint 2. |
| endpoint 2 Department | Department of endpoint 2. |
| Protocol | Protocol used by the connection. |
| ThresholdName | Name of the threshold configured for the connections. |
| ThresholdType | Response time/throughput. |
| AutoThreshold | Whether the threshold is auto. |
| ThresholdValue | The current value of the threshold. |
| The Results table | Contains the results from the last 24 hours for each of the connections. |
| ConnID | ID of the connection that this result belongs to. |
| RunTime | Date and time of the run. |
| Failure | Whether the test ran successfully. |
| FailureCause | If test failed, the cause of the failure. |
| TransactionCount | Transaction count. |
| TotalBytes | Total bytes. |
| TotalTime | Total time. |
| AboveThreshold | Whether the run was above threshold. |
| The SLA table | Contains the SLA's as configured by the user. |
| Name | Name of the SLA. |
| AppScriptName | The application script name of the application that this SLA is against. |
| AppScriptID | The unique ID of the application script corresponding to this SLA. |
| AvailSpecified | Does this SLA contain an availability objective. |
| AvailValue | The availability objective |
| RespTimeSpecified | Does this SLA contain a response time objective. |
| RespTimeValue | Response time objective. |
| ThruSpecified | Does this SLA contain a Throughput objective. |
| ThruValue | Throughput objective. |

Referring to the flowchart of FIG. 5, operations for establishing a test schedule, from the perspective of console node 20, will now be described for an embodiment of the present invention. As the console node functions are carried out by a console engine as described herein, it is necessary to establish one hardware station connected to the network as the console node 20. This may be provided by installation of the console engine software on an existing hardware device or by addition of a new hardware device executing the console engine code and supporting object database 50 (block 150). Once the console node 20 has been established, an operator (preferably through control configuration agent 70) establishes the connections 100 and the associated supported entity type objects 102–108 in object database 50.

Figure 5:
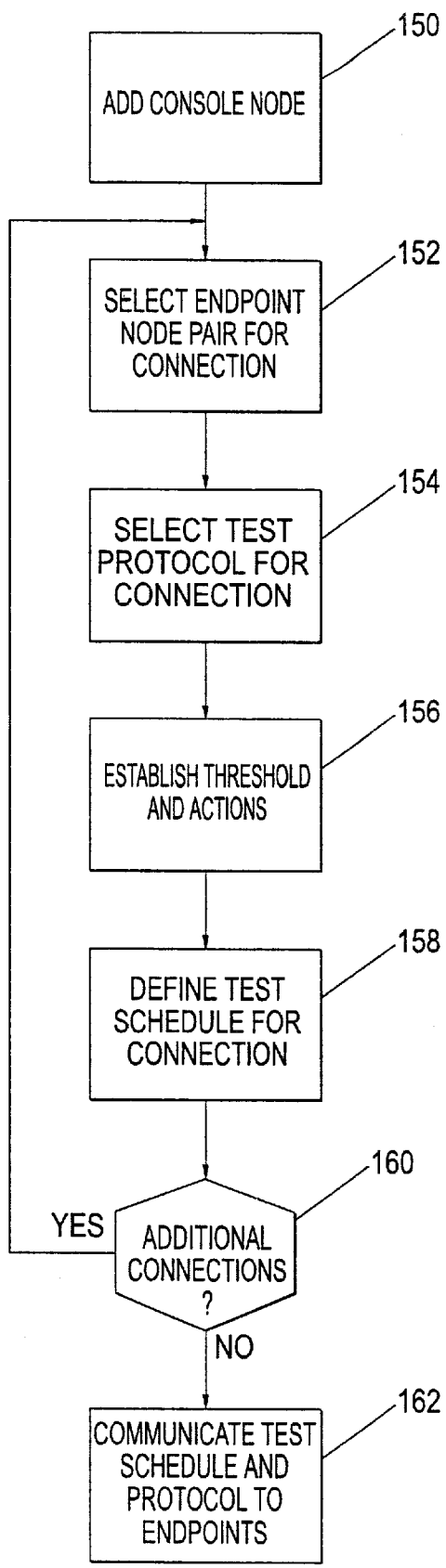
FIG. 5 is a flowchart illustrating operations for establishing test schedules according to an embodiment of the present invention.

As illustrated in FIG. 5, a first and second endpoint node 14, 15, 16, 17, 18 defining an endpoint node pair 22, 24 is selected for a connection 100 (block 152). A test protocol is then established for the connection 100 (block 154). The test protocol includes defining the network communication level protocol (such as TCP) and an associated application script 114 for the connection 100. Where the thresholding aspects of the present invention are utilized as in the illustrated embodiment of FIG. 5, applicable thresholds 110 and actions 118 are established for connection 100 (block 156). Furthermore, a test schedule 108 is specified for the connection 100 which defines when the connection 100 will execute the test protocol between the endpoints nodes 14, 15, 16, 17, 18 (block 158). If additional connections 100 are to be established in object database 50, operations return to block 152 through 158 to establish the associated configuration for additional connections 100 (block 160).

The test schedule, including the test protocol, is communicated to at least one of the endpoint nodes 14, 15, 16, 17, 18 associated with each connection for implementation. The protocol may be transferred from the receiving endpoint nodes 14, 15, 16, 17, 18 to an associated node of the pair using any of the embodiments described previously in connection with FIG. 2 or, alternatively, both endpoint nodes associated with the connection may receive their test schedule from console node 20.

Operations for transmitting schedules and receiving reports from the perspective of the console node 20 will now be described for an embodiment of the present invention with reference to FIG. 6. At block 180, console node 20 attempts to transmit schedules to an endpoint node 14, 15, 16, 17, 18. If no transmission error is detected in transmitting the schedule (block 182), the console node 20 determines if a report of results is expected from the endpoint node 14, 15, 16, 17, 18 based upon the transmitted schedule (block 184). With reference to FIG. 3, schedule transmission operations would typically be performed by endpoint configuration agent 66 while the report time operations of block 184 would be performed by scheduled task agent 82.

If it is time to receive a report from an endpoint node pursuant to the active schedule 108 for that node and its associated connection 100, a report is received (block 186). The receipt of the report will typically be performed by results collector agent 64. (See FIG. 3). If the report has been successfully received at block 188, operations return to block 190 and, if no schedule updates are required, to block 184 to await the next scheduled report time for the connection. If changes have been made to the test schedule 108 affecting the connection 100, the new schedules are transmitted (block 180) before returning to monitoring for receipt of reported results (block 184).

If a transmit error is detected in communicating a schedule (block 182), or a report is not received when expected (block 188), operations move to block 192 where the communication error is reported to endpoint probe agent 68 (FIG. 3) to attempt reconnection with the endpoint node 14, 15, 16, 17, 18. As described previously, the endpoint probe operations are repeated on a periodic basis, preferably with an increasing wait time between each successive attempt to reconnect. Accordingly, if it is time for an endpoint probe attempt (block 194), endpoint probe agent 68 attempts to reconnect with the endpoint node 14, 15, 16, 17, 18 (block 196). Failures may be reported and recorded as error events at block 196. Furthermore, endpoint probe agent 68 may itself determine the scheduling of probe attempts or, alternatively, coordinate with scheduled task agent 62 in determining scheduling of probe attempts. In other words, endpoint probe agent 68 may establish a set time for a repeat attempt after a failed attempt to contact an endpoint node 14, 15, 16, 17, 18 and then place a time-stamped object in the work queue of scheduled task agent 62. Scheduled task agent 62 will, in turn, generate a probe task and place it in the work queue of event probe agent 68 at the appropriate time responsive to the time-stamped object in the work queue of schedule task agent 62.

If an attempt to connect is unsuccessful at block 198, operations return to block 194 to await the next time for attempting to probe a failed endpoint node 14, 15, 16, 17, 18. Alternatively, if a connection is successfully established by endpoint probe agent 68 at block 198, operations return to block 190 to determine if a schedule update is required.

Figure 7:
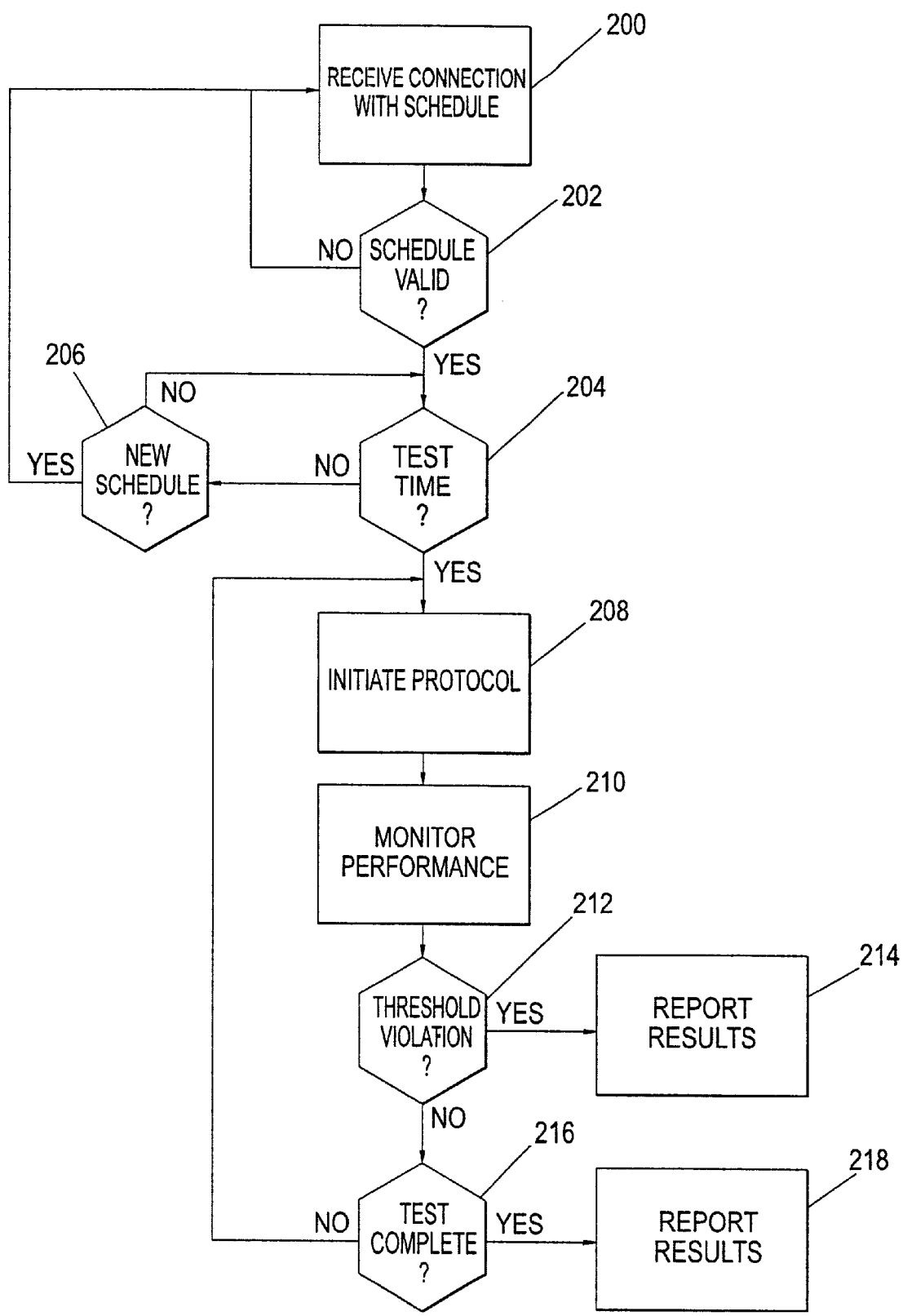
FIG. 7 is a flowchart illustrating operations for an endpoint node implementing a test schedule according to an embodiment of the present invention.

Referring now to FIG. 7, operations for an endpoint node 14, 15, 16, 17, 18 associated with a connection 100 having a test schedule 108 will be further described for an embodiment of the present invention. At block 200, the endpoint node 14, 15, 16, 17, 18 receives a connection 100 with an associated test schedule 108. At block 202, the endpoint node 14, 15, 16, 17, 18 determines if the received schedule 108 is valid. A schedule 108 may be classified as not valid based upon errors in receipt or a time out factor. It is preferred that, in implementing the present invention, every transmitted test schedule 108 be provided a default expiration date after which it will be treated as not valid. This feature is preferred because each endpoint node 14, 15, 16, 17, 18 supporting a connection 100 operates responsive to its received test schedule (or schedules) 108 independent of intervention by console node 20. Accordingly, it would be possible for console node 20 to lose track of test schedules 108 over an extended period of time (for example due to a system failure) under which condition test traffic might continue to be generated and load the communication network without providing any benefits as there will be no reporting of the measured results for use in network performance analysis. Accordingly, a received test schedule 108 which is not modified would cease to be valid, for example after two weeks of execution, after which point in time, the endpoint node 14, 15, 16, 17, 18 would cease to execute the subsequent steps described in FIG. 7 and would return to block 200 awaiting receipt of a valid test schedule.

Operations for an endpoint node 14, 15, 16, 17, 18 supporting a connection 100 pursuant to a valid schedule 108 begin at block 204. The endpoint node 14, 15, 16, 17, 18 determines, based upon the received schedule 108 and its own internal calendar and clock information, the appropriate times to initiate execution of its received test protocol and for the endpoint node 14, 15, 16, 17, 18 reporting results to console node 20. If it is not yet the appropriate test time at block 204, determines if a new or updated schedule 108 is available (block 206) and, if so, receives the new schedule 108 and associated connection 100 (block 200). At the appropriate test time pursuant to the test schedule 108, the endpoint node 14, 15, 16, 17, 18, initiates execution of the test protocol (block 208). During execution of the test protocol, the endpoint node 14, 15, 16, 17, 18 monitors the network performance (block 210). Monitoring operations and the associated capture of network performance test results are more fully described in the '919 patent and will not be further described herein.

For the illustrated embodiment of FIG. 7 utilizing the thresholding aspect of the present invention, the endpoint node 14, 15, 16, 17, 18 determines whether there has been a violation of the threshold criteria for any of the performance parameters (block 212). A violation of the threshold criteria at block 212 triggers, after a rerun, an unscheduled reporting of results including the threshold crossing information (block 214). If other test protocols or test scripts within a protocol remain to be executed (block 216), operations return to block 208 for initiation of the protocols or scripts. If no threshold violations are detected, result reports are periodically batch delivered to console node 20 pursuant to the test scheduled associated with the connection (block 218).

It is to be understood that, in implementing the endpoint node 14, 15, 16, 17, 18 based threshold violation detection aspect of the present invention, the monitoring of performance operations (block 210) include both the capture of raw data (timing measurements) and the conversion of the raw data over a period of time specified by the test protocol into network performance test results which may be used for comparison to the threshold criteria of an associated threshold 110. Accordingly, an instance of a test protocol will generally be completed before threshold violation detection operations at block 212. However, it is also possible to provide a test protocol where threshold calculations and detection may occur at intermediate points providing for the looping from block 218 until test completion as illustrated in FIG. 7.

While batch reporting of results at block 218 in FIG. 7 is illustrated as following an individual test completion, it is to be understood that batch reporting may be on a periodic clock basis rather than linked to completion of specific tests. For example, test results from all connections 100 associated with an endpoint node 14, 15, 16, 17, 18 for a 24 hour period could be reported at a single point in the day to console node 20. Furthermore, as performance measurement calculations are performed at the endpoint nodes 14, 15, 16, 17, 18, it is not necessary to report all raw data measurements back to console node 20. Instead, the calculated network performance test results may be directly transferred to console node 20. This alternative approach provides for a reduction in the amount of data traffic on the network 12 which is generated by the performance analysis systems and methods of the present invention.

Figure 6:
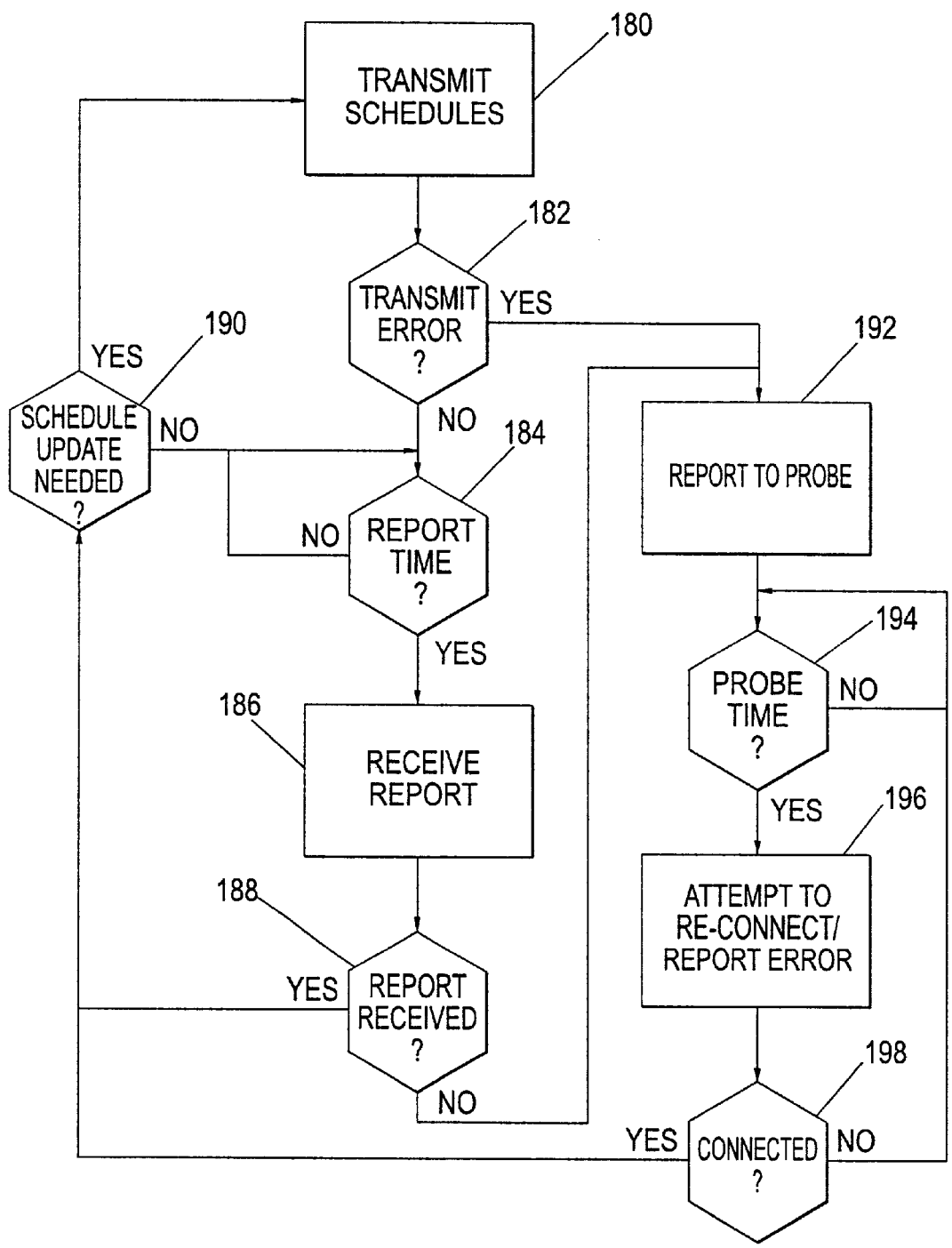
FIG. 6 is a flowchart illustrating operations for monitoring endpoint nodes according to an embodiment of the present invention.

As should be apparent from the preceding discussion with reference to the flowcharts of FIGS. 5–7, the present invention provides for independent execution of operations by endpoint nodes 14, 15, 16, 17, 18 based on test schedules 108 received from a console node 20 which are subject to change at any time by a user interfacing with console node 20 through control configuration agent 70. Accordingly, in a further aspect of the present invention, operations are provided for maintaining the integrity of the object database 50 which operations are capable of handling transitional periods in which the desired state of an endpoint node 14, 15, 16, 17, 18 is not aligned with the actual state. State tracking is provided according to an embodiment of this aspect of the present invention based upon separately tracking in the object database 50 the actual and desired states of each connection 100. The respective and actual desired states for each connection 100 for one embodiment of the present invention are illustrated in Table 5.

TABLE 5

| State | Description |
|---|---|
| Connection States | |
| Actual States | |
| Uninitialized | Schedule for the connection has not yet been delivered to the endpoint. |
| SteadyState | The connection is running. |
| NewScheduleNeeded | Changes were made to the configuration that require a new schedule to be sent for the connection |
| DeliveringSchedule | The schedule for this connection is in the process of being delivered. |
| DeliveringSchedule | The schedule for this connection is in the process of being delivered. |
| PendingDelete | User has requested that the connection be deleted. The endpoint needs to be contacted to delete the connection. |
| Deleted | The endpoint for the connection has been contacted and the connection has been deleted. |
| PendingDisabled | User has requested that the connection be disabled. The endpoint needs to be contacted to disable the connection. |
| Disabled | The endpoint for the connection has been contacted and the connection has been disabled. |

TABLE 5-continued

| State | Description |
|---|---|
| Connection States | |
| Error | The connection has failed to run due to a problem with the configuration. |
| Desired States | |
| MSEnabled | The connection has been enabled by the user |
| MSDisabled | The connection has been disabled by the user |
| MSDeleted | The connection has been deleted by the user |

As can be seen from the descriptions provided of the various states in Table 5, this aspect of the present invention can maintain the integrity of the connection named entities 100 in the object database 50 in a manner which can accommodate requests for modifications to a connection state while recognizing that the actual implementation of that state through communications with the associated endpoint nodes 14, 15, 16, 17, 18 for the connection 100 requires some time. As a result, test schedules 108 may be implemented according to the present invention while still allowing asynchronous input of updated test schedules by users without violating the integrity of the object database 50 or causing errors in the execution of the test schedules 108. Operations for coordination of interrelated tasks, including a description of the use of work queues and desired and actual state variables, suitable for use with the present invention are further described in a concurrently filed patent application entitled "Methods, Systems and Computer Program Products for Coordination of Operations for Interrelated Tasks" (Attorney Docket No. 5670-7) which is incorporated herein by reference as if set forth in its entirety.

Figure 8:
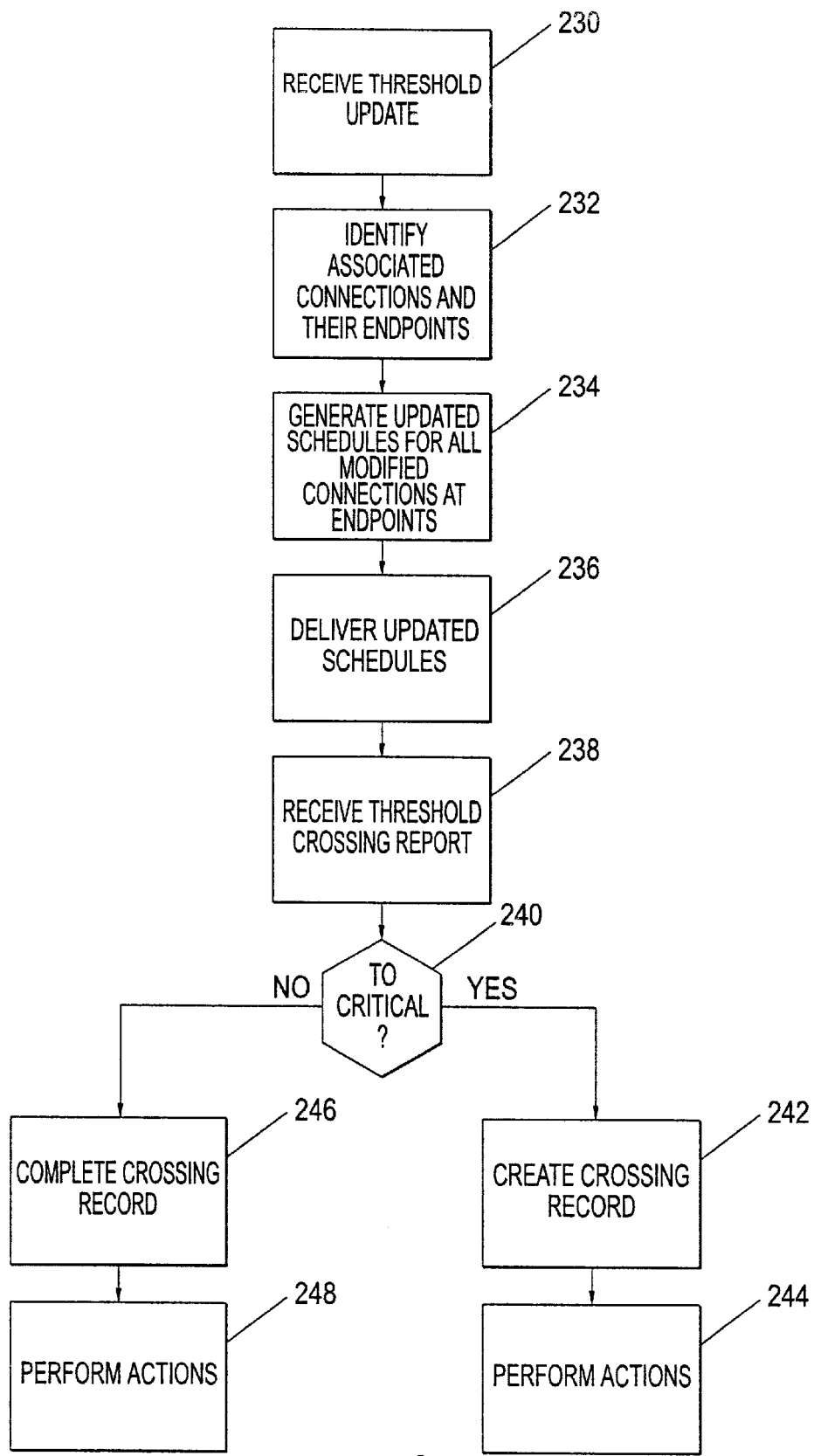
FIG. 8 is a flowchart illustrating operations for a console node implementing thresholding according to an embodiment of the present invention.

Referring to FIG. 8, the thresholding aspect of an embodiment of the present invention will now be described from the perspective of a console node 20. At block 230, the threshold 110 (or thresholds) associated with connection 100 are defined. The thresholds 110 associated with connection 100 are generally initially identified at the time of the creation of the connection 100 record in database 50. However, it is to be understood that a user may modify a threshold 110 setting through control configuration agent 70 at any time during operations of the network performance systems and methods of the present invention. Accordingly, when a threshold 110 is modified by a user input, the connections 100 using or associated with the modified threshold 110 are identified along with their associated endpoints 102 (block 232). Updated schedules are then generated for each connection 100 which is affected by the modified threshold 110 (block 234). The updated test schedules 108 reflecting the new threshold criteria are then delivered to each endpoint node 14, 15, 16, 17, 18 which is associated with an affected connection 100 (block 236).

The remaining blocks in FIG. 8 relate to operations at console node 20 in receiving reports rather than generating and transmitting updated schedules. As generally described previously, reports are received by results collector agent 64 (see FIG. 3). The reports may be exception reports related to violation of threshold criteria based on threshold crossings or scheduled reports. In other words, a threshold crossing report may be provided as a normally scheduled results report which includes an indication that a threshold crossing to an out of normal condition has occurred. When a threshold crossing report is received (block 238), console node 20 determines if the crossing is to a threshold critical condition or returning to a normal condition (block 240). If the crossing is into a critical condition (i.e., violating the threshold criteria), a threshold crossing record is created (block 242). The threshold crossing record is added to the object database 50 and, preferably, only contains information about threshold crossings into a critical region. In addition, the associated actions 118 to be performed responsive to the threshold crossing into critical condition are performed (block 244).

Threshold crossing reports may also be received at block 238 reflecting a transition from a critical condition back to a normal condition. The return to a normal condition may simply be detected as the first received report not indicating a threshold crossing violated condition after a threshold crossing has been reported. When performance returns to the normal region, results collector agent 64 locates the open but not yet completed threshold crossing record in the object database 50 and updates the threshold crossing record with information on the time of return back into the normal region (block 246). Appropriate actions 118 associated with the return to a normal condition for the connection 100 on the threshold 110 are then executed (block 248).

Figure 9:
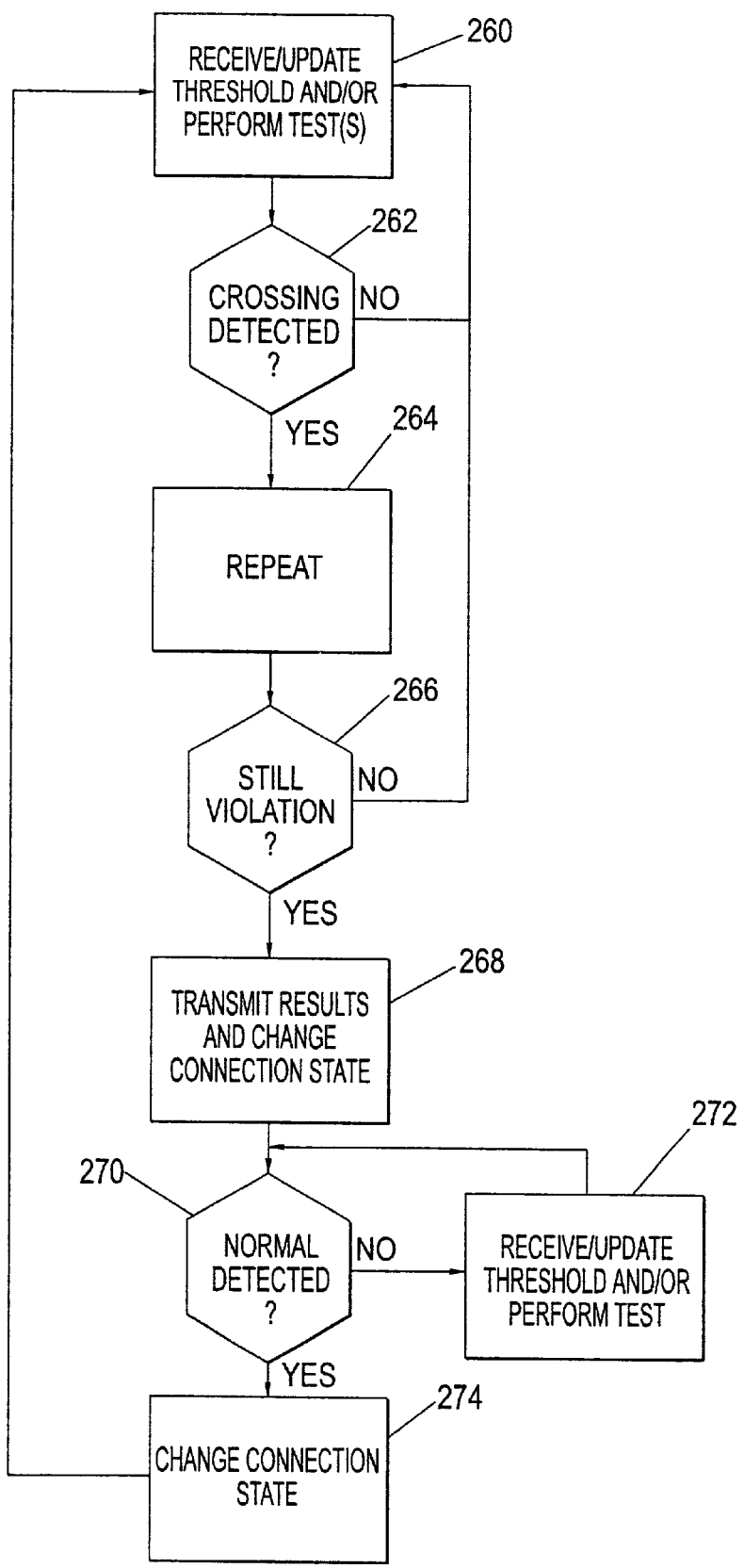
FIG. 9 is a flowchart illustrating operations for an endpoint node implementing thresholding according to an embodiment of the present invention.

Referring now to FIG. 9, threshold operations from the perspective of an endpoint node 14, 15, 16, 17, 18 associated with a connection 100 will now be described. At block 260, a new or updated threshold 110 is received by endpoint node 14, 15, 16, 17, 18 as part of a test schedule 108. Test initiation and monitoring operations then commence as described previously with reference to FIG. 7.

At block 262, if a threshold crossing is detected, the test which produced the threshold crossing is repeated and the performance results are again compared to the threshold criteria (block 264). This retest operation is performed to reduce the likelihood of erroneous triggering of threshold crossing indications by insuring that the violation of the threshold criteria is repeatable for at least two consecutive tests based on comparing the performance test results generated from those tests to the threshold criteria. If following a repeat test (block 264), it is determined that a crossing is no longer detected and that the threshold criteria is no longer being violated (block 266) operations return to block 260. If the crossing detection indicates the threshold criteria has been violated for two successive test attempts (block 266) the test results, including the threshold crossing, are transmitted to the console node 20 and the state of the associated connection 100 is changed to a violation condition (block 268).

Operations then continue by monitoring performance during subsequent scheduled executions of the test protocol to determine if a transition of the parameter in violation of the threshold criteria to the normal state is detected (block 270). If a normal transition is not detected at block 270, operations proceed including continuing testing and receiving updated test schedules which may include changes to the threshold criteria itself (block 272). Once a transition to a normal condition is detected (block 270), the state of the connection 100 is changed to normal (block 274) and operations return to block 260 (block 274).

Thresholding can be a further enhanced by providing for auto-threshold computation according to a further aspect of the present invention. The threshold entities 110 (FIG. 4) may be provided as either fixed or auto-threshold based upon a flag parameter associated with the threshold 110. A threshold 110 may be associated with various of the performance measures provided by the methods and systems of the present invention such as a response time or throughput. Where fixed values are established by a user for a threshold 110, they may be modified according to one embodiment of the present invention to provide for hysterisis to prevent erratic threshold crossings. In other words, after a crossing, the reference critical value applied for detecting the return crossing may be shifted to 10% above or below the user specified critical value respectively to insure that system performance conditions will have changed sufficiently to indicate that the threshold crossing condition has successfully passed (for example, shifting the return threshold above or below the reference point).

The auto-thresholding aspect of the present invention goes a step further by eliminating the need for a user to have to specify a specific critical value for a threshold 100. The critical values for a threshold 110 are instead calculated based upon measured results for a particular associated connection 100. The auto thresholds are calculated with the objective of flagging unacceptable performance.

However, depending upon the algorithm implemented for generating the auto-thresholds, the auto-threshold feature may be unable to successfully flag gradual changes in network performance which take place over an extended period of time because the automatic adjustment of a critical value may shift ahead of the drift of network 12. This could preclude a threshold crossing. It is also to be understood that, as auto-thresholds are based on actual performance measurement data, they are unique to individual connections 100. Accordingly, threshold entities 110 which are auto threshold based, while they may be associated with a plurality of connections 100, will result in a different effective threshold calculation depending upon the properties of the associated connection 100.

To avoid erratic results in auto-thresholding, it is recommended that certain limitations be set on the automatic critical value updating. For example, various limitation criteria on updating an automatic threshold may be provided such as the connection having a minimum of at least 10 results and/or having results collected over a minimum period such as a 24 hour period. An additional parameter for the auto-threshold computation is the number of days of previous performance data which is used in calculating the auto-threshold. For example, 7 preceding days of performance data, if available, may be used in generating the auto-threshold value. Alternatively, both a fixed and auto-threshold may be associated with a connection 100.

It is not necessary to continuously update auto-thresholds particularly if sufficient damping is provided to insure stable operations of performance analysis and threshold crossing detection. Therefore, auto-thresholds may be adjusted for connections 100 which have auto-thresholds on a periodic basis such as a nightly basis. This time period may be increased as greater amounts of prior data are obtained and available for a given connection 100 and threshold 110. For example, for a connection 100 and threshold 110 having a full week or more of data, the auto-threshold may only be updated on a weekly basis rather than a nightly basis.

In one embodiment of the auto-thresholding aspect of the present invention, the operations for calculation of an auto-threshold may be provided as follows:

Stdev=STDEV(results);

Mean=MEAN(results);

Critical_stdev=200ms;

Stdev_count=2;

If (Stdev<Critical_stdev) Auto_threshold_value= Mean+Stdev_count * Critical_stdev;

Else Auto_threshold_value=Mean+Stdev_count * Stdev;

where stdev is the standard deviation based on performance results for the threshold performance measure for the last week of data (or for a lesser specified period where insufficient data is available) and mean is the mean value for the same period. Critical_stdev and Stdev_count may be provided as user configurable values.

This approach to auto-threshold computation provides for different treatment of low variability and high variability channels. For low variability channels, a critical standard deviation value is used in determining the offset of the threshold critical value from the mean to allow crossing detection to always be offset from the mean value by a minimum amount. In contrast, for high variability channel, as illustrated above, the measured standard deviation is used in calculating the critical value.

The establishment of the critical standard deviation count values is preferably based upon a user's expectations for application performance. It is generally known, for example, that a typical user will start to react adversely if an application's response time is greater than 800 milliseconds. Out of the 800 milliseconds available before a user perceives undesirable performance, some amount of time must be allocated for the server of an application and some amount of time must be allocated for the network. As the present invention generally only measures the network portion of the response time, 200 milliseconds of the total application response time is monitored. An automatically computed threshold for the network's response time using the present invention will, therefore, preferably not be set below 200 ms, as a network response time below 200 ms will generally not be noticed by the user of the application. A variation in the network response time of up to 200 milliseconds keeps the overall application response time capped at 1 second. Using this as a reference, connections 100 having a standard deviation of less than 200 milliseconds may be considered as low variation connections 100 while connections 100 having a standard deviation of greater than 200 milliseconds may be considered as high variation connections 100.

As noted in the discussion above, tasks executed by the various agents illustrated in FIG. 3 are interrelated. In that regard, there have been references to the use of work queues to coordinate operations between the various agents 52–70 shown in FIG. 3. To further illustrate the use of work queues in coordinating operations of the various agents 52–70 at console node 20, the following exemplary work queues illustrate the type of object/entities, the source of the object/entity and the conditions triggering entry of the object/entity into the work queues for the respective agents:

| GUI Support Agent 58 | | |
|---|---|---|
| Type | Source | Condition |
| Endpoint | control configuration interface 70 | User invokes verify on an Endpoint. |
| Connection | control configuration interface 70 | User adds, modifies, deletes, enables, disables, or verifies a connection. |
| Output Schedule | control configuration interface 70 | When a schedule is modified by the user. |

-continued

| GUI Support Agent 58 | | |
|---|---|---|
| Type | Source | Condition |
| Protocol Options | control configuration interface 70 | When protocol options are modified by the user. |
| Report | control configuration interface 70 | User adds, modifies, deletes, or requests an immediate generation of a report. |
| Report Template | control configuration interface 70 | A report template is added, deleted, or modified in the database. |
| Schedule | control configuration interface 70 | When a schedule is modified by the user. |
| Script | control configuration interface 70 | When a script is modified by the user. |
| System Info | control configuration interface 70 | When system options are modified by the user. |
| Threshold | control configuration interface 70 | When a threshold is modified by the user. |

| Endpoint Probe Agent 68 | | |
|---|---|---|
| Type | Source | Condition |
| Endpoint | scheduled task agent 62 | Scheduled task agent 62 wakes up to ensure that the server has heard from the endpoint in within the expected time. If the endpoint has not contacted the server within the expected time, the endpoint is moved to Probe agent 68's work queue. |
| | endpoint Config | Endpoint Config attempts to deliver a schedule to the endpoint. If it fails to contact the endpoint, the endpoint is moved to Probe Agent 68's work queue. |
| | GUI Support agent 58 | When a verify on an endpoint is requested. |

| Endpoint Configuration Agent 66 | | |
|---|---|---|
| Type | Source | Condition |
| Endpoint | GUI Support agent 58 Probe agent 68 scheduled task agent 62 | Property of a connection with the given endpoint as endpoint is changed. Verify on a connection is requested. The endpoint is now reachable and a new schedule needs to be delivered to it. Scheduled task agent 62 wakes up Sunday morning at 1:30 an places all endpoints in the endpoint Config's work queue to update the schedules at the endpoints. Whenever scheduled task agent 62 recomputes the auto threshold value of a connection on a day other than Sunday, it places the corresponding endpoint on endpoint Config's work queue. |

| Scheduled Task Agent 62 | | |
|---|---|---|
| Type | Source | Condition |
| Report | GUI Support agent 58 | GUI Support agent 58 process a Report or a Report Template in its work queue. |

FIGS. 5–9 above are flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

What is claimed is:

1. A method for testing the performance of a communications network including a plurality of endpoint nodes comprising the steps of:

adding a console node residing on a computer to the network;

defining a connection associated with at least one of the endpoint nodes;

defining a test schedule for the connection;

communicating the test schedule to the associated endpoint node from the console node;

receiving network performance test results from the endpoint node a the console node based on the test schedules;

wherein the step of defining a connection comprises the step of defining an endpoint node specific test protocol between the at least one endpoint node and an associated second endpoint node to simulate communications traffic therebetween to be tested; and wherein the step of defining a connection comprises the step of defining at least one performance threshold for the connection.

2. A method according to claim 1, wherein the step of defining a connection comprises the step of defining an action to be taken responsive to a detected violation of the at least one performance threshold.

3. A method according to claim 1 wherein the step of defining a connection comprises the step of defining a plurality of connections associated with the plurality of endpoint nodes wherein each of the plurality of connections is associated with a pair of the plurality of endpoint nodes and defines an endpoint node specific test protocol between the pair of the plurality of endpoint nodes to simulate communications traffic therebetween to be tested.

4. A method according to claim 1 further comprising the following steps that are performed by one of the at least one endpoint node and the associated second endpoint node:

receiving the test schedule;

executing the endpoint node specific test protocol over the network between the a least one endpoint node and the associated second endpoint node at a start time for initiating execution specified in the test schedule;

monitoring the performance of the network while the endpoint node specific test protocol is executed to obtain the network performance test results; and communicating the network performance test results to the console node over the network.

5. A method for testing the performance of a communications network including a plurality of endpoint nodes comprising the steps of:

adding a console node residing on a computer to the network;

defining a connection associated with at least one of the endpoint nodes;

defining a test schedule for the connection;

communicating the test schedule to the associated endpoint node from the console node;

receiving network performance test results from the endpoint node at the console node based on the test schedules;

wherein the step of defining a connection comprises the step of defining an endpoint node specific test protocol between the at least one endpoint node and an associated second endpoint node to simulate communications traffic therebetween to be tested;

wherein the step of defining, a connection comprises the step of defining a plurality of connections associated with the plurality of endpoint nodes wherein each of the plurality of connections is associated with a pair of the plurality of endpoint nodes and defines an endpoint node specific test protocol between the pair of the plurality of endpoint nodes to simulate communications traffic therebetween to be tested; and wherein the step of defining a test schedule comprises the step of defining a test schedule for each of tie plurality of connections, each test schedule including a start time for initiating execution of the associated endpoint node specific test protocol and a repeat schedule for re-initiating execution of the associated endpoint node specific test protocol.

6. A method according to claim 5 wherein the step of defining a test schedule comprises the step of defining a test schedule, the test schedule including an expiration time for terminating re-initiating execution of the associated endpoint node specific test protocol.

7. A method according to claim 5 wherein the step of communicating the test schedule comprises the step of transmitting each of the test schedules, including transmitting the endpoint node specific test protocols associated with each of the test schedules, to at least one of the associated pair of the plurality of endpoint nodes for each test schedule.

8. A method according to claim 7 wherein the step of receiving comprises the step of receiving over the network, at the console node, network performance results from at least one of the associated pair of the plurality of endpoint nodes based on measurements from execution of the associated endpoint node specific test protocol.

9. A method according to claim 8 wherein the step of receiving comprises the step of receiving network performance results from at least one of the associated pair of the plurality of endpoint nodes at time intervals based on the associated test schedule of the connection associated with the at least one of the associated pair of the plurality of endpoint nodes.

10. A method according to claim 9 wherein the step of communicating the test schedule is followed by the step of re-connecting with the at least one of the associated pair of the plurality of endpoint nodes if network performance results are not received from the at least one of the associated pair of the plurality of endpoint nodes within a criteria time interval after expiration of one of the time intervals at which results were expected.

11. A method according to claim 10 wherein the step of re-connecting comprises the step of indicating an error if unable to re-connect with the at least one of the associated pair of the plurality of endpoint nodes after a selected number of attempts to re-connect.

12. A method for testing the performance of a communications network including a plurality of endpoint nodes comprising the steps of:
adding a console nod residing on a computer to the network;
defining a connection associated with at least one of the endpoint nodes;
defining a test schedule for the connection;
communicating the test schedule to the associated endpoint node from the console node;
receiving network performance test results from the endpoint node at the console
node based on the test schedules;
wherein the step of defining a connection comprises the step of defining an endpoint node specific test protocol between the at least one endpoint node and an associated second endpoint node to simulate communications traffic therebetween to be tested;
further comprising the following steps that are performed by one of the at least one endpoint node and the associated second endpoint node:
receiving the test schedule;
executing tie endpoint node specific test protocol over the network between the at least one endpoint node and the associated second endpoint node a start time for initiating execution specified in the test schedule;
monitoring the performance of the network while the endpoint node specific test protocol is executed to obtain the new work performance test results; and
communicating the network performance test results to the console node over the network; and
repeating the executing, monitoring and communicating steps at a repeat time for re-initiating execution specified in the test schedule.

13. A method for testing the performance of a communications network including a plurality of endpoint nodes comprising the steps of:
adding a console node residing on a computer to the network;
defining a connection associated with at least one of the endpoint nodes;
defining a test schedule for the connection;
communicating the test schedule to the associated endpoint node from the console node;
receiving network performance test results from the endpoint node at the console node based on the test schedules;
wherein the step of defining a connection comprises the step of defining an endpoint node specific test protocol between the at least one endpoint node and an associated second endpoint node to simulate communications traffic therebetween to be tested;
further comprising the following steps that are performed by or of the at least one endpoint node and the associated second endpoint node:
receiving the test schedule;
executing the endpoint node specific test protocol over the network between the at least one endpoint node and the associated second endpoint node at a star time for initiating execution specified in the test schedule;
monitoring the performance of the network while the endpoint node specific test protocol is executed to obtain the network performance test results;
communicating the network performance test results to the console node over the network; and
wherein the step of communicating the network performance test results is initiated at a selected time following completion of the monitoring step.

14. A method according to claim 13 wherein the step of communicating the test schedule is followed by the step of re-connecting with the one of the at least one endpoint node and the associated second endpoint node if the network. performance results are not received at the console node at a criteria time based on the selected time and the start time.

15. A method according to claim 14 wherein the step of re-connecting comprises the step of indicating an error if unable to re-connect with the one of the at least one endpoint node and the associated second endpoint node after a selected number of attempts to re-connect.

16. A method for testing the performance of a communications network including a plurality of endpoint nodes comprising the steps of:
adding a console node residing on a computer to the network;
defining a connection associated with at least one of the endpoint nodes;
defining a test schedule for the connection;
communicating the test schedule to the associated endpoint node from the console node;
receiving network performance test results from the endpoint node at the console node based on the test schedules; and
wherein the test schedule includes an associated test protocol and wherein the step of defining a test schedule comprises the step of defining a test schedule including a start time for initiating execution of the associated test protocol and a repeat schedule for re-initiating execution of the associated test protocol.

17. A method according to claim 16 wherein the step of defining a test schedule comprises the step of defining a test schedule including an expiration time for terminating re-initiating execution of the associated test protocol.

18. A method according to claim 16 wherein the step of communicating the test schedule comprises the step of transmitting the test schedule to the at least one of the endpoint nodes over the network.

19. A method according to claim 18 wherein the step of receiving comprises the step of receiving over the network, at the console node, network performance results from the at least one of the endpoint nodes based on measurements from execution of the associated test protocol.

20. A method according to claim 19 wherein the step of receiving comprises the step of receiving network performance results from the at least one of the endpoint nodes at time intervals based on the test schedule.

21. A method according to claim 20 wherein the step of communicating the test schedule is followed by the step of re-connecting with the at least one of the endpoint nodes if network performance results are not received from the at least one of the endpoint nodes within a criteria time interval after expiration of a time interval at which network performance results were expected.

22. A method according to claim 21 wherein the step of re-connecting comprises the step of indicating an error if unable to re-connect with the at least one of the endpoint nodes after a selected number of attempts to re-connect.

23. A method for testing the performance of a communications network including an endpoint node comprising the steps of:
 adding a console node residing on a computer to the network;
 wherein the following steps are performed by the console node:
  defining a connection associated with the endpoint node, the connection having an associated endpoint node specific test protocol between the endpoint node and an associated second endpoint node to simulate communications traffic therebetween to be tested and an associated performance threshold;
  defining a test schedule including a start time for initiating execution of the associated endpoint node specific test protocol and a repeat schedule for re-initiating execution of the associated endpoint node specific test protocol for the connection;
  communicating the test schedule to at least one of the endpoint node and the second endpoint node from the console node over the network;
  receiving an indication of a violation of the performance threshold if the threshold has been violated; and
  receiving network performance test results over the network from the endpoint node at the console node based on the test schedule; and
 wherein the following steps are performed by at least one of the endpoint node and the second endpoint node:
  monitoring the performance of the network while the endpoint node specific test protocol is executed over the network to obtain network performance test results;
  determining if the performance threshold has been violated;
  reporting an indication of a violation of the performance threshold to the console if the threshold has been violated; and
  reporting network performance results over the network to the console node based on the test schedules.

24. A method according to claim 23 wherein the performance threshold is an auto-threshold wherein the performance threshold is determined based on determinations of a selected performance characteristic from obtained network performance test results.

25. A method according to claim 24 wherein the auto-threshold provides a first detection criteria establishing the performance threshold for the connection if the connection has a first standard deviation for the selected performance characteristic and a second detection criteria establishing the performance threshold for the connection if the connection has a second standard deviation for the selected performance characteristic, the first standard deviation exceeding a selected standard deviation and the second standard deviation being less than the selected standard deviation.

26. A system for testing the performance of a communications network comprising:
 a console node residing on a computer connected to the network;
 an endpoint node residing on a computer connected to the network;
 wherein the console node comprises:
  means for defining a connection associated with the endpoint node, the connection having an associated endpoint node specific test protocol between the endpoint node and an associated second endpoint node to simulate communications traffic therebetween to be tested and an associated performance threshold;
  means for defining a test schedule including a start time for initiating execution of the associated endpoint node specific test protocol and a repeat schedule for re-initiating execution of the associated endpoint node specific test protocol for the connection;
  means for communicating the test schedule to at least one of the endpoint node and the second endpoint node from the console node over the network;
  means for receiving an indication of a violation of the performance threshold if the threshold has been violated; and
  means for receiving network performance test results over the network from the endpoint node at the console node based on the test schedule; and
 wherein at least one of the endpoint node and the second endpoint node comprise:
  means for monitoring the performance of the network while the endpoint node specific test protocol is executed over the network to obtain network performance test results;
  means for determining if the performance threshold has been violated;
  means for reporting an indication of a violation of the performance threshold to the console node if the threshold has been violated; and
  means for reporting network performance results over the network to the console node based on the test schedules.

27. A computer program product for testing the performance of a communications network, comprising:
 a computer readable storage medium having computer readable program code means embodied in said medium, said computer-readable program code means comprising:

computer-readable program code means for defining a connection associated with an endpoint node, the connection having an associated endpoint node specific test protocol between the endpoint node and an associated second endpoint node to simulate communications traffic therebetween to be tested and an associated performance threshold;

computer-readable program code means for defining a test schedule including a start time for initiating execution of the associated endpoint node specific test protocol and a repeat schedule for re-initiating execution of the associated endpoint node specific test protocol for the connection;

computer-readable program code means for communicating the test schedule to at least one of the endpoint node and the second endpoint node from the console node over the network;

computer-readable program code means for receiving an indication of a violation of the performance threshold if the threshold has been violated; and computer-readable program code means for receiving network performance test results over the network from the endpoint node at the console node based on the test schedule.

28. A computer program product for testing the performance of a communications network, comprising:

a computer readable storage medium having computer readable program code means embodied in said medium, said computer-readable program code means comprising:

computer-readable program code means for receiving a test schedule from a console node, the test schedule including an identification of an associated second endpoint node defining a connection and a start time for initiating execution over the network of an associated endpoint node specific test protocol and a repeat schedule for re-initiating execution of the associated endpoint node specific test protocol for the connection;

computer-readable program code means for monitoring the performance of the network while the endpoint node specific test protocol is executed over the network to obtain network performance test results;

computer-readable program code means for determining if the performance threshold has been violated;

computer-readable program code means for reporting an indication of a violation of the performance threshold to the console node if the threshold has been violated; and computer-readable program code means for reporting network performance results over the network to the console node based on the test schedules.

29. A console system for testing the performance of a communications network including a plurality of endpoint nodes, the system comprising:

means for defining a connection associated with at least one of the endpoint nodes;

means for defining a test schedule for the connection;

means for communicating the test schedule to at least one of the endpoint nodes over the network;

means for receiving network performance test results over the network from the at least one of the endpoint node based on the test schedules;

wherein the means for defining a connection comprises means for defining an endpoint node specific test protocol between the at least one endpoint node and an associated second endpoint node to simulate communications traffic therebetween to be tested; and wherein the means for defining a connection comprises means for defining at least one performance threshold for the connection.

30. A console system for testing the performance of a communications network including a plurality of endpoint nodes, the system comprising:

means for defining a connection associated with at least one of the endpoint nodes;

means for defining a test schedule for the connection;

means for communicating the test schedule to at the at least one endpoint node over the network;

means for receiving network performance test results over the network from the at least one endpoint node based on the test schedules;

wherein the means for defining a connection comprises means for defining an endpoint node specific test protocol between the at least one endpoint node and an associated second endpoint node to simulate communications traffic therebetween to be tested;

wherein at least one of the at least one endpoint node and the associated second endpoint node further comprise:

means for receiving the test schedule;

means for executing the endpoint node specific test protocol over the network between the at least one endpoint node and the associated second endpoint node at a start time for initiating execution specified in the test schedule;

means for monitoring the performance of the network while the endpoint node specific test protocol is executed to obtain the network performance test results;

means for communicating the network performance test results to the console system over the network; and further comprising means for repeating initiation of operations of the executing, monitoring and communicating means at a repeat time for re-initiating execution specified in the test schedule.

31. A console system for testing the performance of a communications network including a plurality of endpoint nodes, the system comprising:

means for defining a connection associated with at least one of the endpoint nodes;

means for defining a test schedule for the connection;

means for communicating the test schedule to at the at least one endpoint node over the network;

means for receiving network performance test results over the network from the at least one endpoint node based on the test schedules;

wherein the means for defining a connection comprises means for defining an endpoint node specific test protocol between the at least one endpoint node and an associated second endpoint node to simulate communications traffic therebetween to be tested;

wherein at least one of the at least one endpoint node and the associated second endpoint node further comprise:

means for receiving the test schedule;

means for executing the endpoint node specific protocol over the network between the at least one endpoint node and the associated second endpoint node at a start time for initiating execution specified in the test schedule;

means for monitoring the performance of the network while the endpoint node specific test protocol is executed to obtain the network performance test results;

means for communicating the network performance test results to the console system over the network; and wherein the means for communicating the network performance test results further comprises means for initiating communication of the network performance test results at a selected time after monitoring of the performance of the network is completed.

32. A console system for testing the performance of a communications network including a plurality of endpoint nodes, the system comprising:

means for defining a connection associated with at least one of the endpoint nodes;

means for defining a test schedule for the connection;

means for communicating the test schedule to at the at least one endpoint node over the network;

means for receiving network performance test results over the network from the at least one endpoint node based on the test schedules; and wherein the test schedule includes an associated test protocol and wherein the means for defining a test schedule comprises means for defining a test schedule including a start time for initiating execution of the associated test protocol and a repeat schedule for initiating execution of the associated test protocol.

33. A computer program product testing the performance of a communications network including a plurality of endpoint notes, comprising:

a computer readable storage medium having computer readable program code means embodied in said medium, said computer-readable program code means comprising:

computer-readable program code means for defining a connection associated with at least one of the endpoint nodes;

computer-readable program code means for defining a test schedule for the connection;

computer-readable program code means for communicating the test schedule to the associated endpoint node over the network; and computer-readable program code means for receiving network performance test results over the network from the endpoint node based on the test schedule;

wherein the computer-readable program code means for defining a connection comprises computer-readable program code means for defining an endpoint node specific test protocol between the at least one endpoint node and an associated second endpoint node stimulate communications traffic therebetween to be tested; and wherein the computer-readable program code means for defining a connection comprises computer-readable program code means for defining at least one performance threshold for the connection.

34. A computer program product testing the performance of a communications network including a plurality of endpoint nodes, comprising:

a computer readable storage medium having computer readable program code means embodied in said medium, said computer readable program code means comprising:

computer readable program code means for defining a connection associated with at least one of the endpoint nodes;

computer readable program code means for defining a test schedule for the connection;

computer readable program code means for communicating the test schedule to the associated test schedule node over the network;

computer readable program code means for receiving network performance test results over the network from the endpoint node based on the test schedules; and wherein the test schedule includes an associated test protocol and wherein the computer-readable program code means for defining a test schedule comprises computer-readable program code means for defining a test schedule including a start time for initiating execution of the associated test protocol and a repeat schedule for re-initiating execution of the associated test protocol.

* * * * *